United States Patent
Kang

(10) Patent No.: US 10,941,062 B2
(45) Date of Patent: Mar. 9, 2021

(54) MICROBUBBLE GENERATOR FOR ENHANCED PLASMA TREATMENT OF LIQUID

(71) Applicant: Onvector LLC, King of Prussia, PA (US)

(72) Inventor: Jun Kang, Cherry Hill, NJ (US)

(73) Assignee: Onvector LLC, King of Prussia, PA (US)

(*) Notice: Subject to any disclaimer, the term of this patent is extended or adjusted under 35 U.S.C. 154(b) by 0 days.

(21) Appl. No.: 16/192,090

(22) Filed: Nov. 15, 2018

(65) Prior Publication Data
US 2019/0084850 A1 Mar. 21, 2019

Related U.S. Application Data

(63) Continuation of application No. 14/630,843, filed on Feb. 25, 2015, now abandoned.
(Continued)

(51) Int. Cl.
*C02F 1/72* (2006.01)
*C02F 1/78* (2006.01)

(52) U.S. Cl.
CPC .......... *C02F 1/72* (2013.01); *C02F 1/78* (2013.01); *C02F 1/722* (2013.01); *C02F 2305/02* (2013.01)

(58) Field of Classification Search
CPC .......... C02F 1/72; C02F 1/78; C02F 2305/02; C02F 1/722
See application file for complete search history.

(56) References Cited

U.S. PATENT DOCUMENTS

| 2002/0144953 A1* | 10/2002 | Kerfoot | B09C 1/08 210/741 |
| 2014/0014516 A1* | 1/2014 | Kumagai | C02F 1/4608 204/556 |
| 2014/0353223 A1 | 12/2014 | Nishimura | |

FOREIGN PATENT DOCUMENTS

| JP | 2008006336 | 1/2008 |
| JP | 2009102582 A * | 5/2009 |

(Continued)

OTHER PUBLICATIONS

Kim, H.S., Use of plasma gliding arc discharges on the inactivation of *E. coli* in water, Oct. 9, 2013 (Year: 2013).*

(Continued)

*Primary Examiner* — Waqaas Ali
(74) *Attorney, Agent, or Firm* — Mintz Levin Cohn Ferris Glovsky and Popeo, P.C.

(57) ABSTRACT

A system for the plasma treatment of a liquid is described. The system includes a storage chamber containing a liquid and a head-space, a gas source connected to a sparger positioned within the liquid, a pair of electrodes positioned within the liquid and substantially above the sparger, a microbubble generator positioned within the liquid, and a conduit between the head-space and the microbubble generator, such that gas from the head space can travel through the conduit to the microbubble generator. Also described is a method of plasma treating a liquid. The method includes the steps of positioning a liquid in a storage chamber at a volume that provides a head-space in the storage chamber, feeding a gas to a sparger that is positioned within the liquid to form a first set of bubbles in the liquid, passing the first set of bubbles between a pair of electrodes positioned within the liquid and substantially above the sparger, generating a plasma discharge between the electrodes, and feeding the gas in the head-space into a microbubble generator posi- (Continued)

tioned within the liquid to form a second set of bubbles in the liquid, wherein the second set of bubbles are in the range of 0.1 to 5 microns in diameter.

5 Claims, 23 Drawing Sheets

Related U.S. Application Data

(60) Provisional application No. 61/944,111, filed on Feb. 25, 2014.

(56) References Cited

FOREIGN PATENT DOCUMENTS

| | | | |
|---|---|---|---|
| JP | 2009255027 | | 11/2009 |
| JP | 2013049015 | A * | 3/2013 |
| KR | 1020130053205 | A * | 5/2013 |

OTHER PUBLICATIONS

Kim et al. "Use of plasma gliding arc discharge on the inactivation of *E. coli* in Water" Separation and Purification Technology, 120 (2013) 423-428.

Kim et al. "Residual Effects and energy cost of Gliding Arc Discharge Treatment on the Inactivation of *E. coli* in water" International Journal of Heat and Mass Transfer; Sep. 2014, vol. 77: 1075-1083.

* cited by examiner

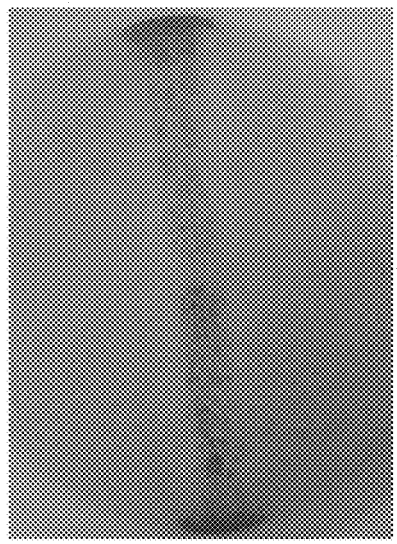
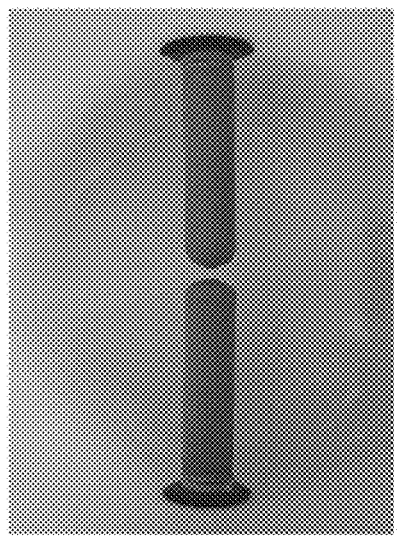
Fig. 10

MICROBUBBLE GENERATOR FOR ENHANCED PLASMA TREATMENT OF LIQUID

CROSS-REFERENCE TO RELATED APPLICATIONS

This application is a continuation of U.S. patent application Ser. No. 14/630,843 filed Feb. 25, 2015, which claims the benefit of U.S. patent application Ser. No. 61/944,111 filed Feb. 25, 2014, for which the entire disclosures of each are incorporated by reference herein in their entireties.

BACKGROUND OF THE INVENTION

One of the simplest ways to produce plasma discharge in air is to utilize two electrodes (i.e., cathode and anode) closely placed in air, i.e., 2-5 mm. When the voltage between the two electrodes increases to a certain value such as 2 kV, breakdown of air between the two electrodes takes place, generating plasma discharges. Depending on the magnitude of the voltage across the two electrodes, a number of different types of plasma discharges are produced, including corona, spark, and arc.

When one attempts to produce plasma discharges in liquid, it is more complicated because the electric conductivity of the liquid is often much greater than that of gas. For example, when one tries to generate a spark type plasma discharge in liquid having high electrolytic conductivity, electrons can instantaneously and continuously flow from cathode electrode to anode electrode, a phenomenon that can be referred to as leakage between the two electrodes. Thus, it has become common practice to inject gas between the two electrodes to assist the process of breakdown such that spark discharges can effectively be generated in liquid at 1-3 kV. FIG. 1 shows a number of examples of gas injection in liquid for the generation of plasma discharges in liquid water (Reference: Yang Y, Cho Y I, and Fridman A, *Plasma Discharge in Liquid: Water Treatment and Applications.* 2012, New York: CRC Press.) Of course, when the voltage increases beyond 10 kV, a spark type plasma discharge can be generated without the help of gas injection. However, the use of higher voltages requires increasingly complex power supplies.

When gas injection is utilized to assist the generation of plasma discharges in high electric conductivity liquid, it is essential to have sufficiently large sized gas bubbles that can fill the whole space between the two electrodes. Typically, the gap distance between the two electrodes in liquid used for spark plasma discharge is often 2-3 mm, and it is desirable to generate gas bubbles of at least 2-3 mm or greater to ensure that plasma ignition occurs between the electrodes in liquid.

When gas is used in the production of plasma discharges in liquid, the gas contributes useful components for active plasma-generated chemical species for the treatment of liquid, including molecules such as $H_2O_2$ (hydrogen peroxide) and $O_3$ (ozone), as well as radical species such as $H^*$, $O^*$, $OH^*$, $NO^*$, $O_2^-$ (superoxide radical), where superscript * indicates radical species. In the prior art shown in FIG. 1, the gas that contains useful active chemical species are escaping to the atmosphere in a plasma reactor having an open end at the top, where the plasma-treated gas escapes from the reactor to the atmosphere. This is not desirable because the plasma-treated gas contains the aforementioned active plasma-generated chemical species. Furthermore, in such an open-ended plasma reactor, the pressure of the liquid in the reactor drops to zero gage pressure, thus requiring a pump to transfer liquid to its next location. Thus, there is a need to have a closed plasma reactor with the capability to capture the plasma-treated gas and distribute the plasma-treated gas for the additional treatment of liquid without material loss of hydrostatic pressure in the plasma reactor.

For the distribution of plasma-treated gas to liquid, it is desirable to construct and employ a microbubble generator that can generate submicron-size gas bubbles such that, in spite of density differences between gas and liquid, these microbubbles stay in liquid for long durations in time because the force of buoyancy is at an order of magnitude comparable with drag. In summary, one needs to have a relatively large-size gas bubble in liquid for the generation of plasma discharges in liquid having high electrolytic conductivity within a closed plasma reactor. Then separately, one needs to have a large number of submicron-size gas bubbles to enable plasma-treated gas to mix and make contact with liquid to effectively treat the liquid. The present invention satisfies this need.

SUMMARY OF THE INVENTION

A system for the plasma treatment of a liquid is described. The system includes a storage chamber containing a liquid and a head-space, a gas source connected to a sparger positioned within the liquid, a pair of electrodes positioned within the liquid and substantially above the sparger, a microbubble generator positioned within the liquid, and a conduit between the head-space and the microbubble generator, such that gas from the head space can travel through the conduit to the microbubble generator. In one embodiment, the storage chamber includes a vent valve. In another embodiment, the storage chamber includes a liquid inlet and a liquid outlet. In another embodiment, the conduit between the head-space and the microbubble generator includes a compressor pump. In another embodiment, the sparger includes pores of at least 1 mm in size for the gas from the gas source to flow through. In another embodiment, the microbubble generator includes pores in the range of 0.1 to 5 micron in size for the gas from the head-space to flow through.

Another system for the plasma treatment of a liquid is also described. The system includes a first storage chamber containing a first volume of liquid and a head-space, a gas source connected to a sparger positioned within the first volume of liquid, a pair of electrodes positioned within the first volume of liquid and substantially above the sparger, a second storage chamber containing a second volume of liquid, a microbubble generator positioned within the second volume of liquid, and a conduit between the head-space of the first storage chamber and the microbubble generator, such that gas from the head space of the first storage chamber can travel through the conduit to the microbubble generator. In one embodiment of this system, the first storage chamber includes a vent valve. In another embodiment of this system, the first storage chamber includes a liquid inlet and a liquid outlet. In another embodiment of this system, the second storage chamber includes a liquid inlet and a liquid outlet. In another embodiment of this system, the conduit between the head-space of the first storage chamber and the microbubble generator includes a compressor pump. In another embodiment of this system, the sparger includes pores of at least 1 mm in size for the gas from the gas source to flow through. In another embodiment of this system, the microbubble generator includes pores in the range of 0.1 to 5 micron in size for the gas from the head-space of the first storage chamber to flow through. In another embodiment of this system, a conduit between the first volume of liquid and the second volume of liquid is also included.

Another system for the plasma treatment of a liquid is described. The system includes a first storage chamber containing a first volume of liquid and a head-space, a gas source conduit connected to a sparger positioned within the first volume of liquid, a pair of electrodes positioned within the first volume of liquid and substantially above the sparger, a second storage chamber containing a second volume of liquid and a head-space, a microbubble generator positioned within the second volume of liquid, a conduit between the head-space of the first storage chamber and the microbubble generator, such that gas from the head space of the first storage chamber can travel through the conduit to the microbubble generator, and a conduit between the head-space of the second storage chamber and the gas source conduit to the sparger, such that gas from the head space of the second storage chamber can travel through the conduit to the gas source conduit. In one embodiment of this system, the first storage chamber includes a liquid inlet and a liquid outlet. In another embodiment of this system, the second storage chamber includes a liquid inlet and a liquid outlet. In another embodiment of this system, the conduit between the head-space of the first storage chamber and the microbubble generator includes a compressor pump. In another embodiment of this system, the conduit between the head-space of the second storage chamber and the gas source conduit includes a compressor pump. In another embodiment of this system, the sparger includes pores of at least 1 mm in size for gas to flow through. In another embodiment of this system, the microbubble generator includes pores in the range of 0.1 to 5 micron in size for the gas from the head-space of the first storage chamber to flow through. In another embodiment of this system, a conduit between the first volume of liquid and the second volume of liquid is further included.

A method of plasma treating a liquid is also described. The method includes the steps of positioning a liquid in a storage chamber at a volume that provides a head-space in the storage chamber, feeding a gas to a sparger that is positioned within the liquid to form a first set of bubbles in the liquid, passing the first set of bubbles between a pair of electrodes positioned within the liquid and substantially above the sparger, generating a plasma discharge between the electrodes, and feeding the gas in the head-space into a microbubble generator positioned within the liquid to form a second set of bubbles in the liquid, wherein the second set of bubbles are in the range of 0.1 to 5 microns in diameter.

Another method of plasma treating a liquid is described. The method includes the steps of positioning a first volume of liquid in a first storage chamber at a volume that provides a head-space in the first storage chamber, feeding a gas to a sparger that is positioned within the first volume of liquid to form a first set of bubbles in the first volume of liquid, passing the first set of bubbles between a pair of electrodes positioned within the first volume of liquid and substantially above the sparger, generating a plasma discharge between the electrodes, and feeding the gas in the head-space of the first storage chamber into a microbubble generator positioned within a second volume of liquid in a second storage chamber to form a second set of bubbles in the second volume of liquid, wherein the second set of bubbles are in the range of 0.1 to 5 microns in diameter.

Another method of plasma treating a liquid is described. The method includes the steps of positioning a first volume of liquid in a first storage chamber at a volume that provides a head-space in the first storage chamber, positioning a second volume of liquid in a second storage chamber at a volume that provides a head-space in the second storage chamber, feeding a gas to a sparger that is positioned within the first volume of liquid to form a first set of bubbles in the first volume of liquid, passing the first set of bubbles between a pair of electrodes positioned within the first volume of liquid and substantially above the sparger, generating a plasma discharge between the electrodes, feeding the gas in the head-space of the first storage chamber into a microbubble generator positioned within the second volume of liquid in the second storage chamber to form a second set of bubbles in the second volume of liquid, wherein the second set of bubbles are in the range of 0.1 to 5 microns in diameter, and feeding the gas in the head-space of the second storage chamber into the flow of gas entering the sparger.

BRIEF DESCRIPTION OF THE DRAWINGS

The following detailed description of preferred embodiments of the invention will be better understood when read in conjunction with the appended drawings. For the purpose of illustrating the invention, there are shown in the drawings embodiments which are presently preferred. It should be understood, however, that the invention is not limited to the precise arrangements and instrumentalities of the embodiments shown in the drawings.

FIG. 10 is a set of photographs of microbubble generators with 5-micron pores (top view); (A) before compressed air was introduced, and (B) after compressed air was introduced in water reservoir through the microbubble generators during plasma treatment.

FIG. 12 is a set of tables and images corresponding to results of *E-coli* inactivation experiments and pH variations with an initial water volume of 20 L at water reservoir without (A) and with (B) microbubble generators.

FIG. 18 depicts the results of a plasma treatment for 10-min: results of *E-coli* inactivation experiments and pH variations with an initial water volume of 20 L at reservoir with 12 kJ/L of energy consumption.

FIG. 19 depicts the results of a plasma treatment for 13-min: results of *E. coli* inactivation experiments and pH variations with an initial water volume of 20 L at reservoir with 15.6 kJ/L of energy consumption.

FIG. 21 depicts the results of a plasma treatment for 25-min: Results of *E. coli* inactivation experiments and pH variations with an initial water volume of 20 L at reservoir with 30 kJ/L of energy consumption.

DETAILED DESCRIPTION

Figure 1:
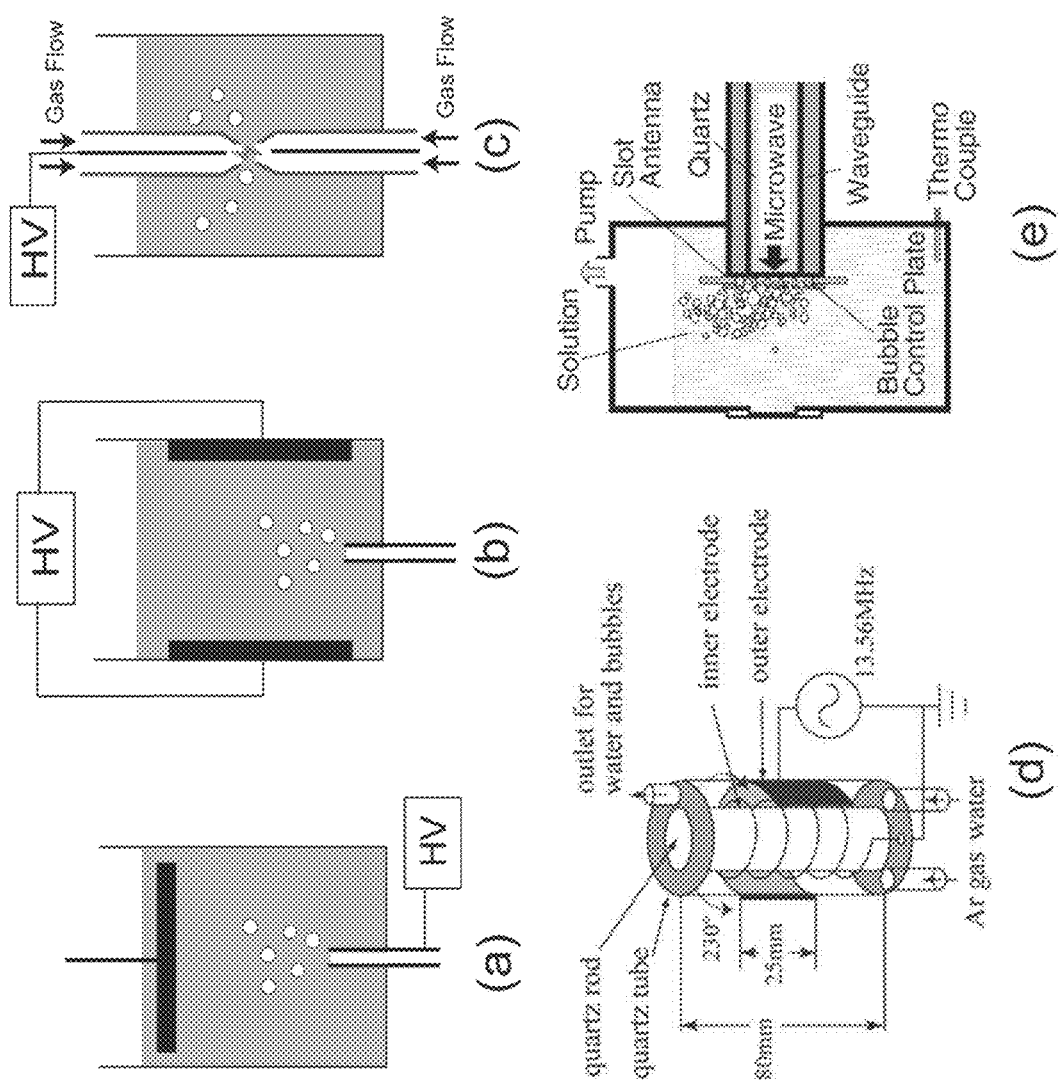
FIG. 1 is a schematic of existing systems where gas injection is used to assist plasma discharges in liquid.

It is to be understood that the figures and descriptions of the present invention have been simplified to illustrate elements that are relevant for a clear understanding of the present invention, while eliminating, for the purpose of clarity, many other elements found in typical plasma treatment systems. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are described.

As used herein, each of the following terms has the meaning associated with it in this section.

It must be noted that as used herein and in the appended claims, the singular forms "a", "an", and "the" include plural references unless the context clearly dictates otherwise. Thus, for example, reference to "a reactor" includes a plurality of reactors and equivalents thereof known to those skilled in the art, and so forth. As well, the terms "a" (or "an"), "one or more" and "at least one" can be used interchangeably herein. It is also to be noted that the terms "comprising," "including," and "having" can be used interchangeably.

"About" as used herein when referring to a measurable value such as an amount, a temporal duration, and the like, is meant to encompass variations of ±20%, ±10%, ±5%, ±1%, and ±0.1% from the specified value, as such variations are appropriate.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, 6 and any whole and partial increments therebetween. This applies regardless of the breadth of the range.

This invention relates to the field of liquid treatment systems using high-voltage plasma discharge produced with the help of gas in liquid. More specifically, the invention pertains to novel systems and methods to disperse plasma-treated gas to liquid.

As described herein, the system utilizes a plasma reactor, which consists of two parts: a liquid-containing part and a gas-containing part. This is distinct from existing systems, in that existing plasma reactors used for liquid treatment have only a liquid-containing part. The plasma reactor described herein may utilize, without limitation, a closed chamber and is therefore a pressurized chamber, wherein the gas and liquid pressures are above zero gage pressure (i.e., 0 psig). Further, the described system utilizes a sparger with holes of at least 1 mm or greater to inject gas between two electrodes in the plasma reactor for the generation of a plasma discharge between the two electrodes. The system also utilizes a microbubble generator with a pore size of 0.2 microns or less to re-inject the gas captured from the top of the plasma reactor into the liquid. In order to re-inject the gas into the liquid, it is essential to be able to maintain the pressure of the gas above atmosphere.

Figure 2:
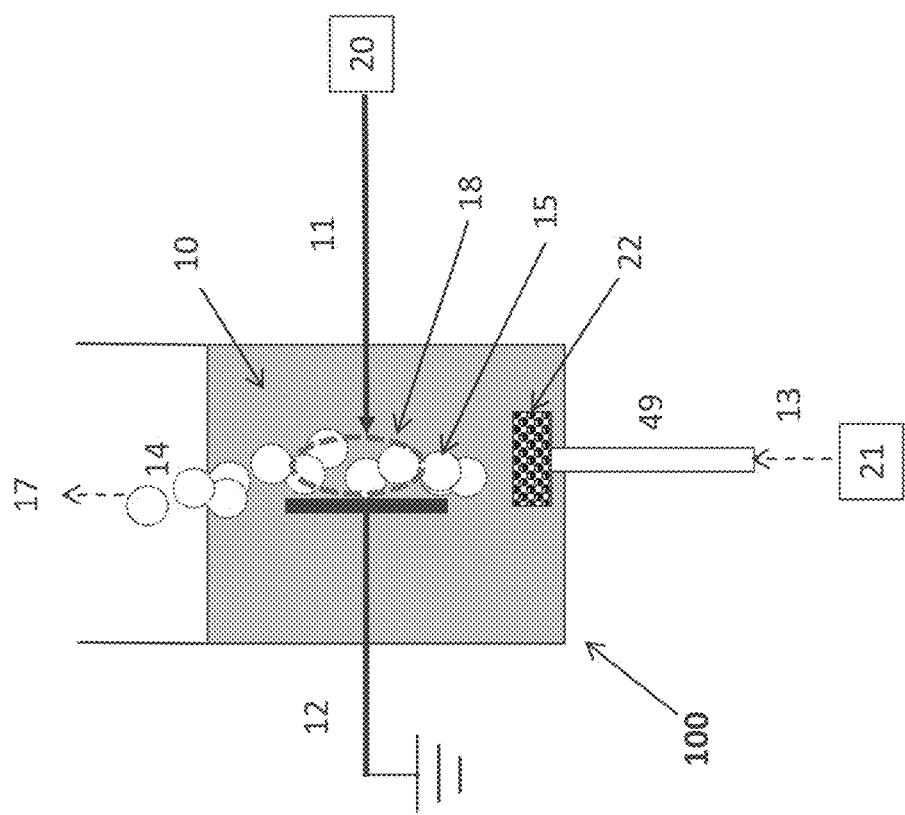
FIG. 2 is a schematic diagram of gas injection between two electrodes using a sparger in a plasma reactor, where the gas after plasma treatment escapes to atmosphere.

In one embodiment and with reference to FIG. 2, a compressed gas 13 may be injected via a gas inlet tube 49 between two electrodes 11 and 12 using a sparger 22 in a plasma reactor 100, where the plasma-treated gas 14 after plasma treatment escapes to atmosphere 17. Gas 13, which is injected into liquid 10 to be treated, may come from any gas source, such as a gas compressor or compressed tank 21. As contemplated herein, gas 13 may include without limitation, air, oxygen, nitrogen, or any other gas or gas mixture desired. Further, liquid 10 or any other liquid body described herein, may be any desired liquid to be treated, such as tap water, cooling water, sea water, waste water, produced water or any other type or condition of water understood by those skilled in the art. Non-water liquids may also be treated using the systems described herein, without limitation. As compressed gas 13 goes through sparger 22, a large number of small gas bubbles 15 of approximately 1 mm in diameter or greater are produced in liquid 10 to be treated between two electrodes 11 and 12 that are driven by a power source 20. In one embodiment, the gap between electrodes may be between 1-5 mm, and more preferably between 2-4 mm. However, it should be appreciated that there is no limitation to the gap range, as this may vary according to the amount of power utilized in the system. For example and without limitation, the power range used may be between 100-500 W, 1-2 kV, and 0.1-0.5 A. It should also be appreciated that higher power levels may be used for high flow rate applications or lower power levels for low flow rate applications. In higher power applications, if voltage is unchanged and amperage increased, then the gap size may also remain the same. However in higher power applications, if voltage is significantly increased, then the gap size could also increase significantly, as would be understood by those skilled in the art. Gas bubbles 15, which were used to assist production of plasma discharges 18 in liquid 10, rise due to buoyancy to the top of the liquid 10 and escape to atmosphere 17. As contemplated herein, the system is not limited to a particular sparger design, and accordingly any standard sparger may be used as would be understood by those skilled in the art. Preferably, the sparger is designed to generate bubbles of approximately 1-10 mm in diameter. As shown in FIG. 2, a high-voltage needle electrode 11 and a plate-shape ground electrode 12 may be used in the system. However, it should be appreciated that other shapes of electrodes can be used to generate plasma discharge in liquid, including, without limitation, plate-to-plate geometry, co-axial geometry, and needle-to-needle geometry.

Figure 3:
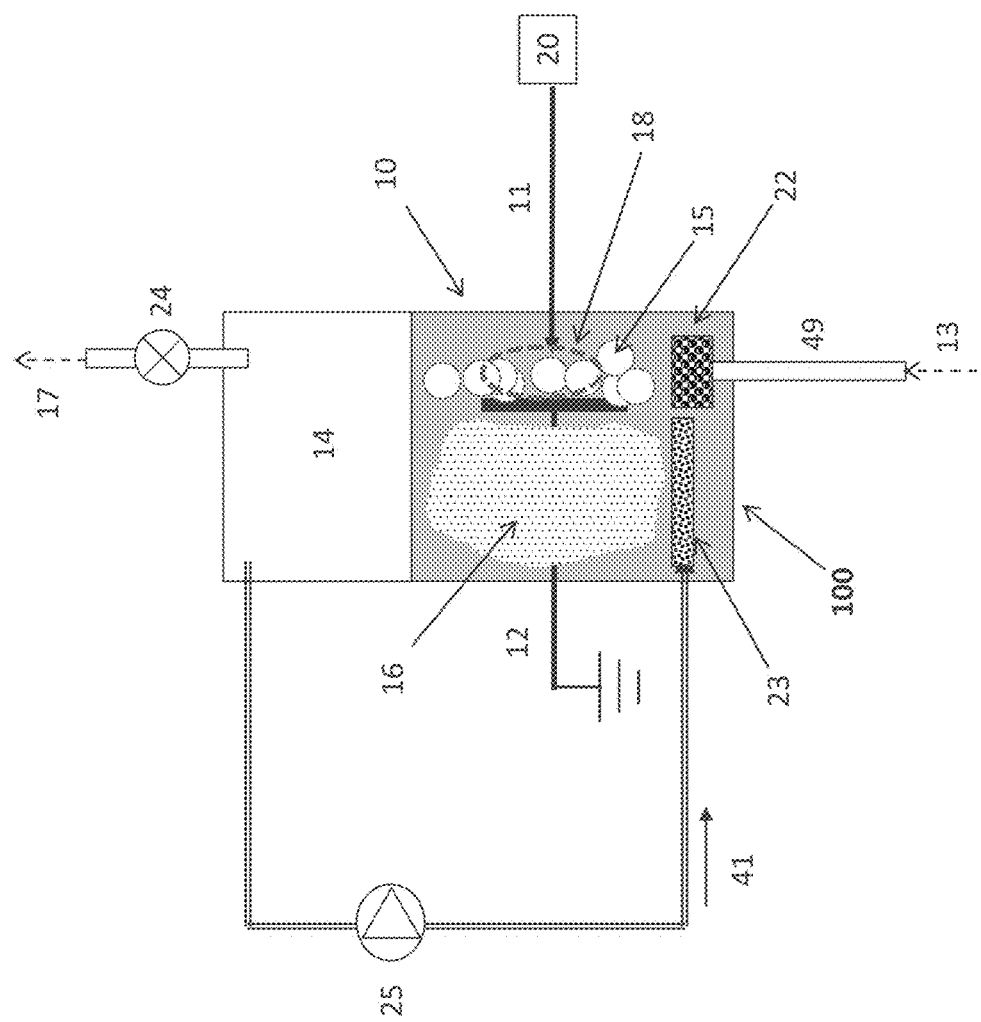
FIG. 3 is a schematic diagram of the plasma reactor in the described system, where the gas after plasma discharge is re-injected to liquid using a microbubble generator in the reactor.

In another embodiment and with reference to FIG. 3, the plasma-treated gas 14 after plasma discharge 18 may be re-injected into liquid 10 via a microbubble generator 23 positioned within liquid 10 of plasma reactor 100. In one embodiment, the microbubble generator may be a cylindrical tube with both ends blocked by endplates. The sidewall of the cylindrical tube may include a large number of micropores through which plasma-treated compressed gas exits the microbubble generator at a size of approximately 0.1-5 microns in diameter. The conduit that brings plasma-treated compressed gas to the microbubble generator may be connected to one of the end plates or to the sidewall near the end plate. It should be appreciated that the microbubble generator may be constructed in any manner understood by those skilled in the art, such that it includes pore sizes suitable for the production of microbubbles in the 0.1-5 micron diameter range in liquid. A compressor 25, and any associated pressure regulator or other related equipment, may be used to re-inject the gas 14 back into liquid 10 in plasma reactor 100 via a conduit 41 leading from the reactor headspace back down into liquid 10. The gas bubbles 15 produced from sparger 22 have a diameter of approximately 1 mm, whereas the microbubbles 16 produced from microbubble generator 23 have a diameter of approximately 0.2 microns. As the gas passes through the space between the two electrodes and makes contact with the plasma discharge repeatedly, the concentrations of molecules produced from the plasma discharge continue to increase with time, Such molecules produced may include, without limitation, active plasma species of $H_2O_2$ (hydrogen peroxide), $O_3$ (ozone), and radical species such as $H^*$, $O^*$, $OH^*$, $NO^*$, $O_2^-$ (superoxide radical). A vent valve 24 may be used to release the buildup of gases in the system beyond a desired pressure threshold.

Figure 4:
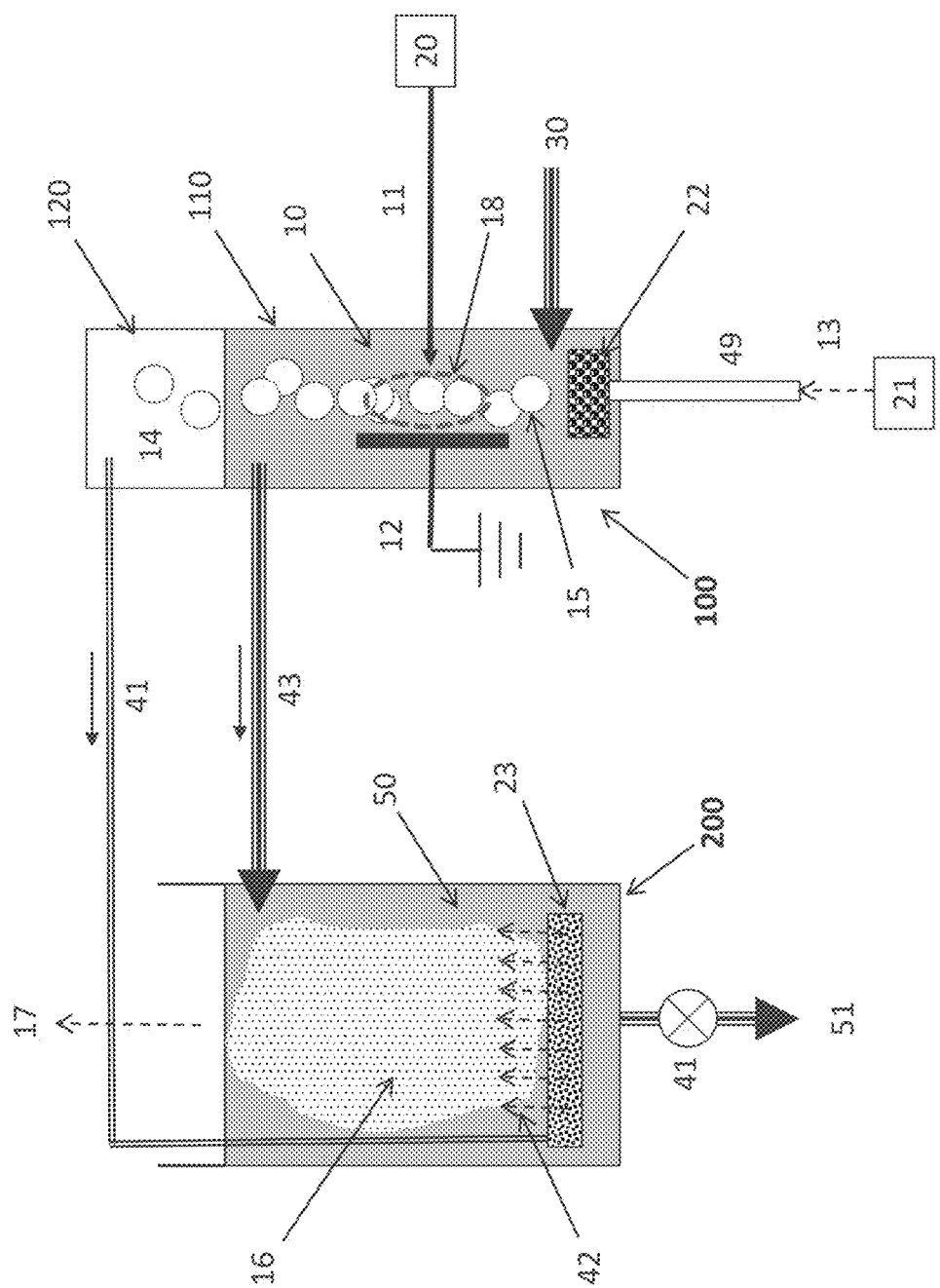
FIG. 4 is a schematic diagram of the plasma reactor and a liquid reservoir in the described system, where the gas after plasma discharge is re-injected to liquid using a microbubble generator in the liquid reservoir.

In another embodiment and with reference to FIG. 4, the plasma-treated gas 14 after plasma discharge 18 may be re-injected into a liquid 50 using microbubble generator 23 in a second liquid reservoir 200. The plasma reactor 100 may include at least two parts: a liquid-containing part 110 and a gas-containing part, or head space 120. The plasma reactor 100 utilizes a closed chamber and is therefore a pressurized chamber, where gas 14 and liquid 10 pressures do not decrease to zero gage pressure (i.e., 0 psig). In other words, reactor 100 has a pressure above atmosphere during operation. The gas-containing part 120 is connected via a connection tube or conduit 41 to microbubble generator 23 positioned within liquid 50, and the liquid-containing part 110 is optionally connected via a connection tube or conduit 43 to liquid 50 in the liquid reservoir 200. The gas bubbles 15 produced from sparger 22 have a diameter of approximately 1 mm, whereas the microbubbles 16 produced from microbubble generator 23 in the liquid reservoir 200 have a diameter of approximately 0.2 microns. The top of the liquid reservoir 200 may be open to the atmosphere 17, or alternatively it may be sealed and contain a vent valve so that the gases eventually escape to the atmosphere 17. When a sufficient amount of liquid 50 is collected in the liquid reservoir 200, a valve 45 located at or near the bottom of the reservoir 200 may open for the transfer of the treated liquid 50 to a separate storage container (not shown).

Figure 5:
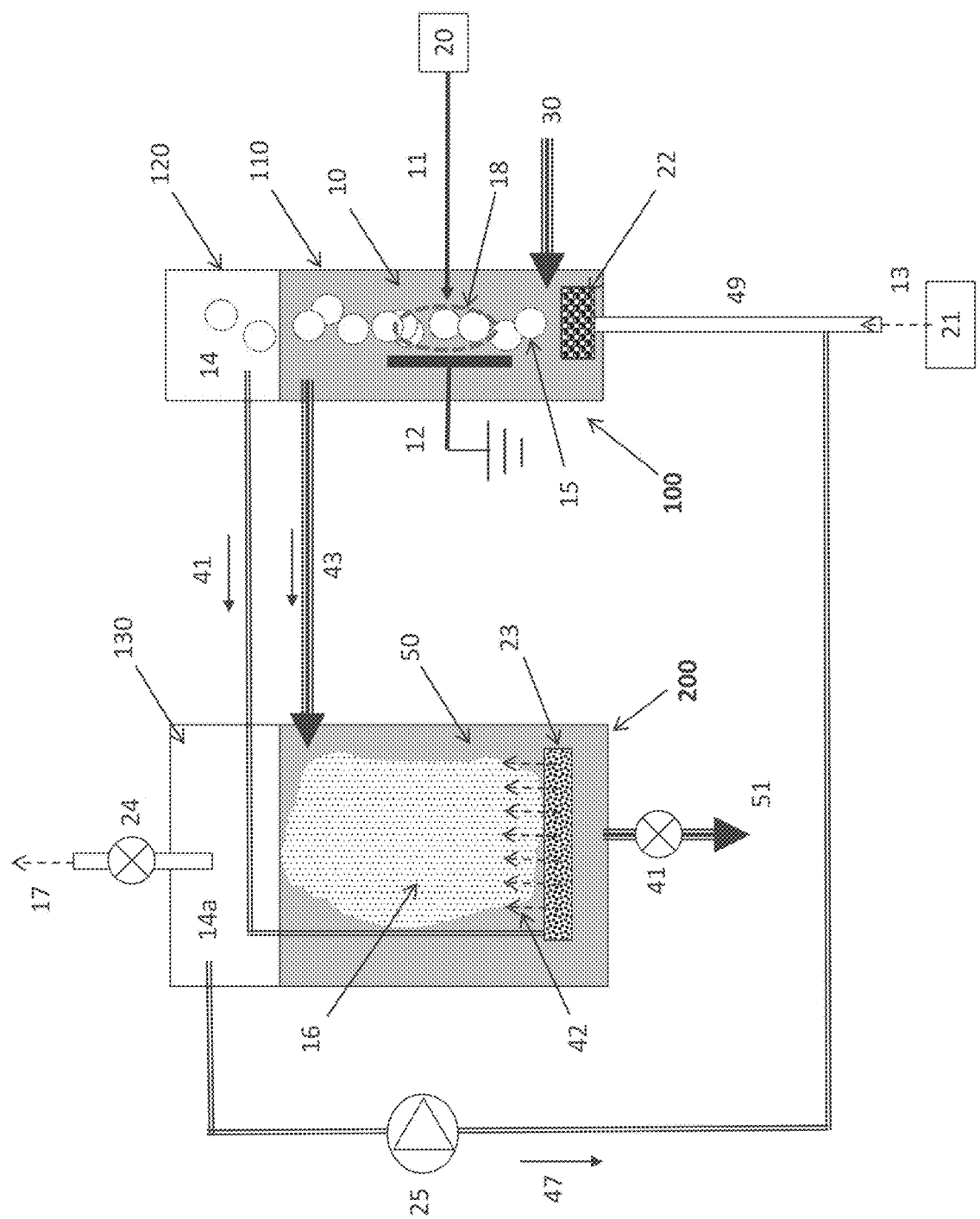
FIG. 5 is a schematic diagram of the plasma reactor and a liquid reservoir in the described system, where the gas after plasma discharge is re-injected to liquid using a microbubble generator in the liquid reservoir, whereas the gas accumulated from the liquid reservoir is also re-injected to plasma reactor.

In another embodiment and with reference to FIG. 5, the plasma-treated gas 14 after plasma discharge 18 may be re-injected into liquid 50 of liquid reservoir 200 using a microbubble generator 23 positioned within the liquid reservoir 200. Again, the plasma reactor 100 may include at least two parts: a liquid-containing part 110 and a gas-containing part 120. The plasma reactor 100 may preferably operate at pressures above atmosphere. The gas-containing part 120 is connected via connection tube 41 to microbubble generator 23, whereas the liquid-containing part 110 is optionally connected via a connection tube 43 to the liquid 50 in the liquid reservoir 200. The gas bubbles 15 produced from sparger 22 have a diameter of approximately 1 mm, whereas the microbubbles 16 produced from microbubble generator 23 in the liquid reservoir 200 have a diameter of approximately 0.2 microns. At the top of the liquid reservoir 200, there is a gas-containing part 130 for the accumulation of gas 14a, which is open to the atmosphere 17 via a vent valve 24 so that the gas 14a eventually escapes to the atmosphere 17 when the pressure at the gas-containing part 130 increases beyond a pre-set value. The gas 14a may then be re-injected to the inlet line 49 via conduit 47 driven by compressor 25. Alternatively, in any of the embodiments described herein, the compressor 25 can be replaced by a venturi tube or other system utilizing a venture-effect (not shown), which may be installed at inlet line 49. When a sufficient amount of liquid 50 is collected in the liquid reservoir 200, a valve 45 located at the bottom of the reservoir 200 may be opened for the transfer of the treated liquid 50 to another storage container (not shown).

Figure 6:
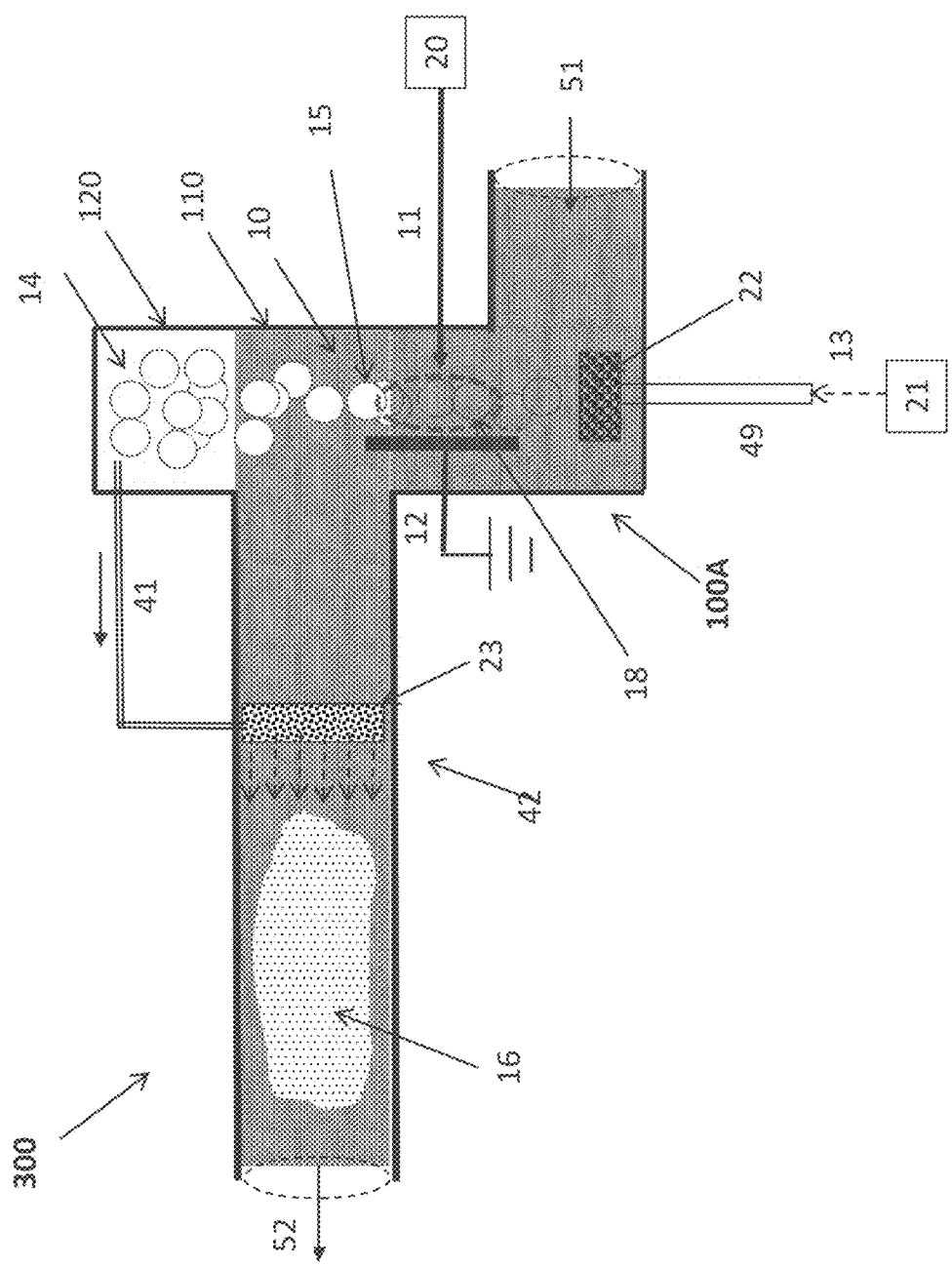
FIG. 6 is a schematic diagram of a plasma reactor integrated into a piping system, where the gas after plasma discharge is re-injected to liquid using a microbubble generator in the piping system.

In another embodiment and with reference to FIG. 6, the plasma reactor 100 may be integrated into a piping flow system 300. Compressed gas 13 is injected via gas inlet tube 49 between two electrodes 11 and 12 using a sparger 22 in an integrated plasma reactor 100A, where the plasma-treated gas 14 after plasma treatment is accumulated within gas-containing part 120. Gas 13, which is injected into liquid 10 to be treated, may come from any gas source, such as a gas compressor or compressed tank 21. As compressed gas 13 goes through sparger 22, a large number of small gas bubbles 15 of approximately 1 mm in diameter or greater are produced in liquid 10 to be treated between two electrodes 11 and 12. Gas bubbles 15, which were used in the production of plasma discharges 18 in liquid 10, rise due to buoyancy to the gas-containing part 120. The plasma-treated gas 14 accumulated at the gas-containing part 120 is re-injected via a connecting tube 41 to liquid in a different portion of the piping system 300 using a microbubble generator 23. The liquid 10 in the plasma reactor 100 may also be transferred into the piping system 300, based on the integration of the plasma reactor 100A with the piping system 300 as shown, or via a separate conduit (not shown). The pressure of the liquid 10 in the plasma reactor 100A does not drop to zero gage pressure in spite of the injection of gas 13 to the plasma reactor 100A because the plasma reactor 100A is a closed system. In other words, the piping system and integrated reactor may operate at pressures above atmosphere. The integrated plasma reactor 100A may include at least two parts: a liquid-containing part 110 and a gas-containing part 120. The gas-containing part 120 may be connected via a connection tube 41 to microbubble generator 23 in the piping system 300. The gas bubbles 15 produced from sparger 22 have a diameter of approximately 1 mm, whereas the microbubbles 16 produced from microbubble generator 23 in the piping system 300 have a diameter of approximately 0.2 microns or smaller. Thus, a large number of microbubbles 16 are dispersed in the liquid in the piping system 300. Untreated liquid enters the integrated plasma reactor 100A via liquid inlet 51. The mixture of liquid and microbubbles 16 moves downstream via liquid outlet 52 towards, for example and without limitation, a liquid storage reservoir, a storage pond, downhole in a shale hydraulic fracturing operation, or a tanker truck.

Figure 7:
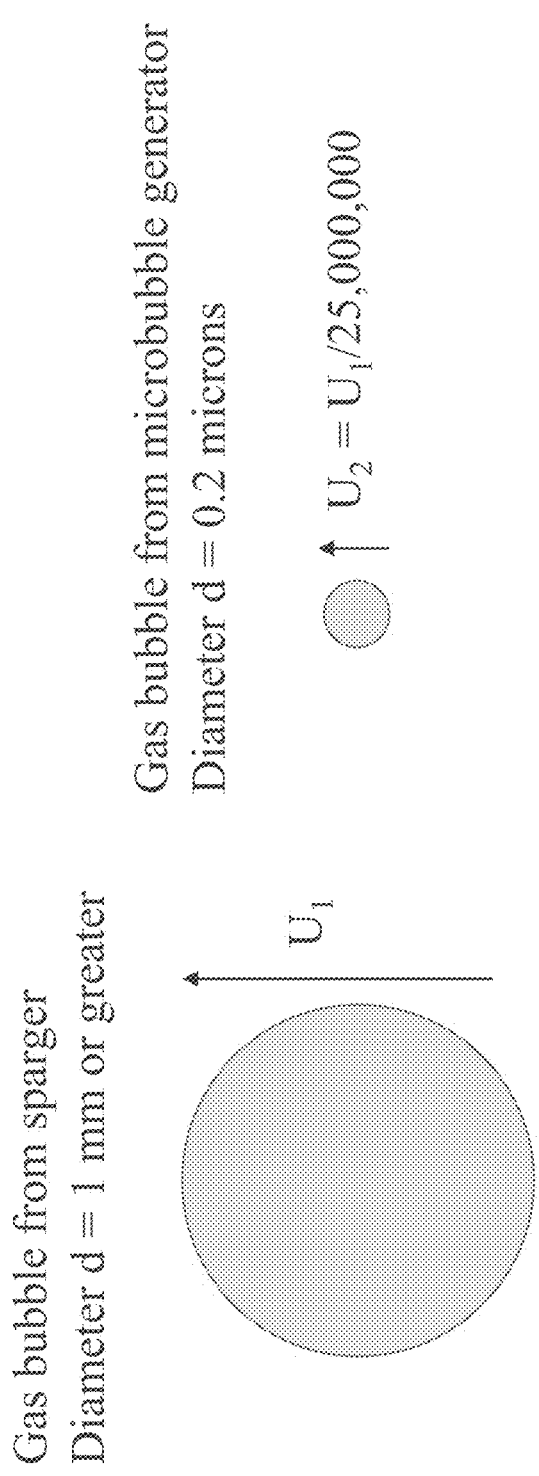
FIG. 7 is a sketch of two bubbles: one is 1-mm diameter bubble produced from a sparger, and the other is 0.2-micron diameter bubble produced from a microbubble generator.

As described herein, the various embodiments of the system may generate a significantly large number of microbubbles in liquid to be treated. Further, microbubbles produced by the described system stay or delay within the liquid medium for long periods of time due to their small diameter. These benefits are depicted in FIG. 7 via the sketch of two bubbles: the left-hand bubble is a 1-mm diameter bubble produced from a sparger 22, and the right-hand bubble is a 0.2-micron diameter bubble produced from a microbubble generator 23. Since the volume of a sphere is proportional to $d^3$, the third power of the sphere diameter, a one 1-mm diameter bubble produced from sparger 22 equates to 25,000,000,000 microbubbles of 0.2-micron diameter after the microbubble generator 23. However, it should be appreciated that the actual sizes of these two classes of bubbles is not limiting. For example, any of the described systems herein may operate using sparger produced bubbles preferably ranging between 1-10 mm in diameter, and microbubble produced bubbles preferably ranging between 0.1-5 microns in diameter, without limitation.

Without being limited to any particular theory, a gas bubble rises in liquid due to the density difference between gas and liquid. Typically, the density of gas (for example, air) is about one thousand times less than that of liquid (such as water). Therefore, the rising velocity (often called, terminal velocity) of a 0.2-micron diameter bubble is approximately 25 million times slower than that of a 1-mm diameter bubble based on the following equation (Reference: Munson B, Okiishi T H, Huebsch W, and Young D, *Fundamentals of Fluid Mechanics*. 7th ed. 2013, New York: John Wiley & Sons, Inc.):

$$U_\infty = \frac{[\rho_{fluid} - \rho_{bubble}]gd^2}{18\mu}$$

Hence, the plasma-treated gas, after going through a microbubble generator as described herein, substantially remains within the liquid to be treated. Further to this, the microbubble generator may create a uniform distribution of microbubbles throughout the liquid volume, thereby creating a consistent platform for contacting and treating the entire volume of liquid with a uniform amount of gas species within the microbubbles. In other words, nearly all the active chemical species produced by the plasma discharges are fully utilized for treatment processes, such as and without limitation: disinfection of microorganisms (for example, *E. coli*, acid-producing bacteria, sulfate-reducing bacteria, among others) in liquid; oxidation and/or excitation of hydrocarbons (for example, methane) in liquid; dissociation of dissolved inorganics such as bicarbonate ions ($HCO_3^-$), and discoloration of opaque liquids (for example, dyed water, black-color produced water containing dissolved hydrocarbon and oil).

Accordingly, the present invention also includes methods of plasma treating a liquid. Such methods may include the use of any of the systems described herein. For example, in one embodiment, the method may include the steps of positioning a liquid in a storage chamber at a volume that provides a head-space in the storage chamber, feeding a gas to a sparger that is positioned within the liquid to form a first set of bubbles in the liquid, passing the first set of bubbles between a pair of electrodes positioned within the liquid and substantially above the sparger, generating a plasma discharge between the electrodes, and feeding the gas in the head-space into a microbubble generator positioned within the liquid to form a second set of bubbles in the liquid, wherein the second set of bubbles are in the range of 0.1 to 5 microns in diameter. In another embodiment, the method may include the steps of positioning a first volume of liquid in a first storage chamber at a volume that provides a head-space in the first storage chamber, feeding a gas to a sparger that is positioned within the first volume of liquid to form a first set of bubbles in the first volume of liquid, passing the first set of bubbles between a pair of electrodes positioned within the first volume of liquid and substantially above the sparger, generating a plasma discharge between the electrodes, and feeding the gas in the head-space of the first storage chamber into a microbubble generator positioned within a second volume of liquid in a second storage chamber to form a second set of bubbles in the second volume of liquid, wherein the second set of bubbles are in the range of 0.1 to 5 microns in diameter. In yet another embodiment, the method may include the steps of positioning a first volume of liquid in a first storage chamber at a volume that provides a head-space in the first storage chamber, positioning a second volume of liquid in a second storage chamber at a volume that provides a head-space in the second storage chamber, feeding a gas to a sparger that is positioned within the first volume of liquid to form a first set of bubbles in the first volume of liquid, passing the first set of bubbles between a pair of electrodes positioned within the first volume of liquid and substantially above the sparger, generating a plasma discharge between the electrodes, feeding the gas in the head-space of the first storage chamber into a microbubble generator positioned within the second volume of liquid in the second storage chamber to form a second set of bubbles in the second volume of liquid, wherein the second set of bubbles are in the range of 0.1 to 5 microns in diameter, and feeding the gas in the head-space of the second storage chamber into the flow of gas entering the sparger. It should be appreciated that the methods contemplated herein may include the use, conditions and functional parameters of any system component part described herein.

EXPERIMENTAL EXAMPLES

The invention is now described with reference to the following Examples. These Examples are provided for the purpose of illustration only and the invention should in no way be construed as being limited to these Examples, but rather should be construed to encompass any and all variations which become evident as a result of the teaching provided herein.

Without further description, it is believed that one of ordinary skill in the art can, using the preceding description and the following illustrative examples, make and utilize the present invention and practice the claimed methods. The following working examples therefore, specifically point out particular embodiments of the present invention, and are not to be construed as limiting in any way the remainder of the disclosure.

Example 1: Use of Plasma Gliding Arc Discharges on the Deactivation of *E-coli* in Water This example was performed to investigate the feasibility of using a gliding arc (GA) discharge to deactivate microorganisms in water. In addition, the combined benefit of $H_2O_2$ and low-pH conditions in water was examined with an emphasis on the residual effect of the plasma treatment on bacterial deactivation in water after the completion of the treatment.

Figure 8:
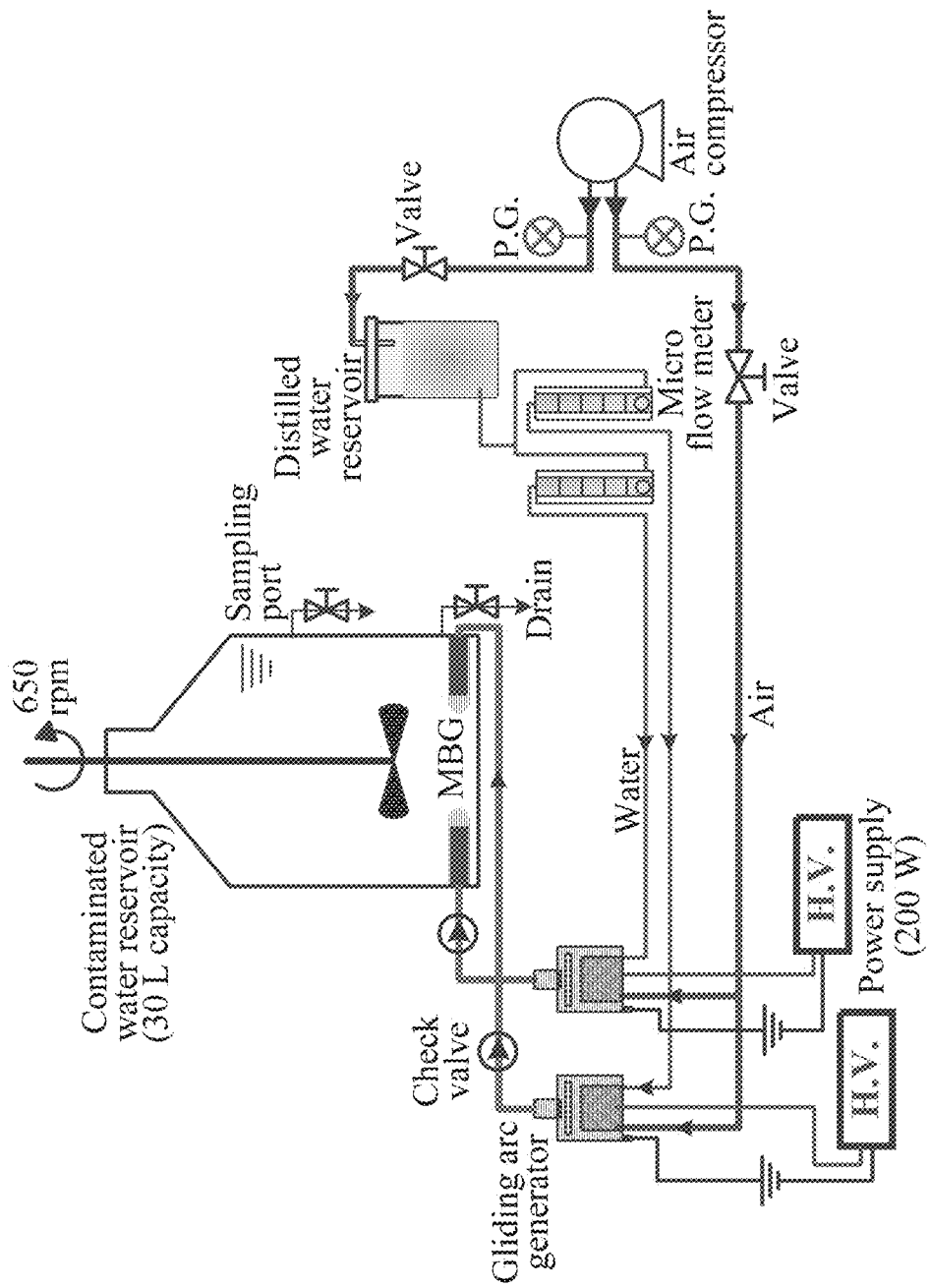
FIG. 8 is a schematic of an experimental system to investigate the feasibility of using a gliding arc (GA) discharge to deactivate microorganisms in water. H.V.=high-voltage power supply, MBG=microbubble generator, P.G.=pressure regulator.

The experimental setup utilized in this example is illustrated in FIG. 8. The test setup consisted of three major parts: the first part is comprised of two identical GA discharge systems, each driven by its own power supply; the second part was made of air- and water-transport systems to provide controlled flows of air and water to the GA discharge system; and the third part was made of a reservoir tank with two microbubble generators to store bacteria-contaminated water and to receive plasma-treated air and distilled water. The basic approach in the example was to have both air and distilled water pass through the GA discharge system first and then to introduce plasma-treated air and water to a large volume of contaminated water at the reservoir (see FIG. 8).

In order to provide airflow to the two GA generators, an air compressor was used, where the air flow rate was controlled with a valve and a pressure regulator. The compressed air was also sent to the top of distilled water reservoir, as shown in FIG. 8, so that water would be pushed out through an exit located at the bottom of the reservoir to the GA generator at a uniform flow rate, which was monitored by a micro flow meter.

Figure 9:
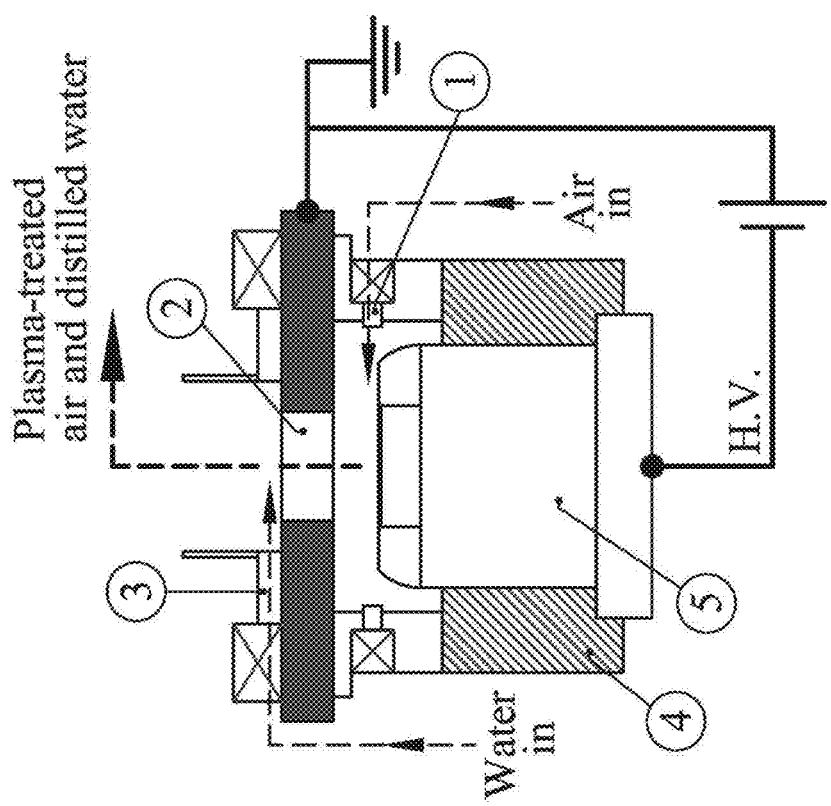
FIG. 9 is a sketch of a gliding arc generator: (1)—6 nozzles for tangential entry of air flow to the gap between two electrodes, ground electrode, (2)—exit nozzle of gliding-arc jet, which acts as a ground electrode, (3)—6 nozzles for the tangential injection of water to the plasma arc jet coming out of the exit nozzle of the gliding-arc discharge system, (4)—a Teflon insulator protecting high-voltage electrode, and (5)—a high-voltage electrode (negative voltage).

FIG. 9 shows a sketch of the GA plasma discharge system. In order to maximize the residence time of the GA discharge itself for effective chemical reactions, a three-dimensional GA discharge system utilizing a vortex flow was used with two circular disk electrodes having a gap of 2.5 mm. The two electrodes were connected to a power supply which delivered 200 W at a maximum voltage of 3 kV. Compressed air was tangentially introduced to the gap space at the outer edge of the two circular electrodes through six small nozzles (see 1 in FIG. 9, diameter=0.5 mm) such that the arc discharge could move along the circumference of the electrodes, resulting in a gliding arc. Both electrodes were made of stainless steel and protected by an insulating material (see 4 in FIG. 9, polytetrafluoroethylene (PTFE, Teflon)) for safe operation. Water was also injected tangentially through six small nozzles (see 3 in FIG. 9, diameter=1.5 mm) to the plasma arc jet exiting from nozzle (see 2 in FIG. 9, diameter=9.5 mm) positioned at the center of the ground electrode. Of note is that water did not make contact with the HV electrode (see 5 in FIG. 9) for safe operation.

A reservoir holding contaminated water with a maximum capacity of approximately 30 L was connected to the exit nozzle of the GA discharge system. After the injected water reacted with the plasma jet from the GA discharge system, both air and plasma-treated water entered the contaminated water reservoir through a 30-cm long flexible plastic tube. In the middle of the flexible tube, a check valve was installed to prevent the back flow of water from the reservoir to the GA discharge system. Two cylindrical microbubble generators were used in the reservoir to generate microbubbles as shown in FIG. 10A, which were made of sintered titanium compacts with 5-micron pores (BEOT, Shijiazhuang, China).

The water reservoir was cleaned after each test with both sulfuric acid and tap water repeatedly and then dried in a fume hood. Then, the water container was filled with 20 L of pure distilled water to prepare for the next test, and the flexible tube from the GA system was re-connected to the reservoir.

The flow rate of water to the GA discharge system was 120 mL/min at a uniform air flow rate of 3.8 scfm, an optimal condition for the present GA discharge system. The pH level in plasma-treated water was measured with a pH meter (HI 9125N, HANNA Instruments, Smithfield, R.I.). Prior to starting each experiment, the pH meter was calibrated at three points (i.e., pH: 4, 7, and 10) using standard-pH solutions provided by the pH meter manufacturer.

*Escherichia coli* (*E-coli*) was used for bacterial experiments. Cultures of *E-coli* were grown for 18 h at 37° C. in an incubator and diluted, yielding a range of concentrations between $10^3$-$10^6$ colony forming units per milliliter (cfu/mL) as initial test conditions. The cfu counts in all water samples were estimated using the aerobic heterotrophic plate count (HPC) method. For bacterial deactivation tests, cultures of *E-coli* were added to the reservoir filled with distilled water of 20 L in volume. Immediately after adding *E-coli* to water, the water reservoir was continuously stirred using an electrical stirrer (Eurostar/IKA, Staufen, Germany) at 650 rpm to distribute *E-coli* uniformly in the reservoir.

After stirring water for 5 min, 50-mL samples were collected in a sterile tube for cfu counts.

Prior to plasma deactivation tests, a control test was performed with an initial bacterial count of $10^5$ cfu/mL in the reservoir holding contaminated distilled water of 20 L, where additional distilled water of 3.84 L was introduced through the GA system at a flow rate of 2×120 mL/min for 16 min as per procedures, but with the plasma power turned off. Then, the water was kept at the reservoir for the next 4 h, while the cfu number in water was determined.

In cases with plasma treatment, the initial concentration of $E$-coli in the reservoir varied from $10^3$ to $10^6$ cfu/mL. Plasma treatment of distilled water was continued for 25 min, while plasma-treated distilled water was continuously sent to the reservoir. Contaminated water having an initial volume of 20 L and plasma-treated water of approximately 6 L were kept in the reservoir for the next 2 h, during which time cfu counts were performed. Six water samples were collected for cfu counts at t=4, 10, 13, 16, 20 and 25 min during the plasma treatment, and four additional samples were obtained at t=30, 60, 90, and 120 min during the storage period for cfu measurements.

Additionally, in order to evaluate microbubble (MB) effects on bacterial deactivation, another series of experiments was performed with two microbubble generators. Six water samples were collected from the reservoir at t=4, 10, 13, 16, 20 and 25 min during plasma treatment, and four more samples were obtained at 30-min intervals during a storage period of 2 h in the cases with low and high initial concentrations (IC) of $E$-coli, indicated in FIG. 11 as MB+Low IC and MB+High IC, respectively. In the case of the medium initial concentration of $E$ coli indicated as MB+Medium IC in FIG. 11, water samples were also collected at t=4, 10, 13, 16, 20 and 25 min during plasma treatment, but at 60-min intervals during a storage period of 4 h for cfu counts.

For heterotrophic plate counts, water samples, each 1 mL in volume, were collected using sterile pipettes and spread on Brain Heart Infusion Agar plate (Fisher Scientific) inside a clean bench within 5 min after collecting 50-mL water samples from the reservoir. Prior to spreading 1 mL of samples on the agar plates, the 50-mL sample was continuously stirred with a vortex mixer (Fisher Scientific: Genie 2). All agar plates containing water samples were dried for 30 min at room temperature inside the clean bench and incubated for 18 h at 37° C. The number of colony forming units was determined using a colony counter (Digital Colony Counter/HYC-560, HYSC, Seoul, Korea). Prior to counting the cfu of $E$-coli on agar plates after incubating, the HPC images were recorded with a camera.

Figure 11:
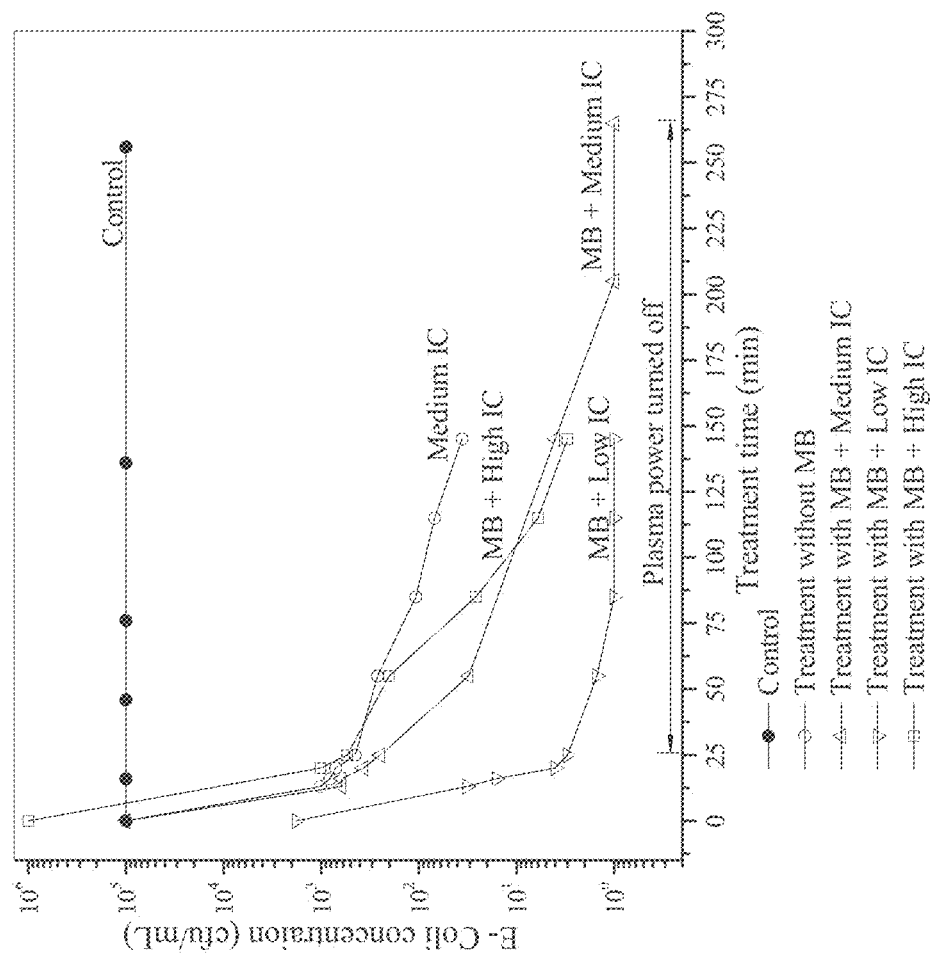
FIG. 11 is a graph depicting results of cfu numbers in *E-coli* inactivation experiments with an initial water volume of 20 L at water reservoir without and with microbubble generators. (MB=microbubble generators, IC=initial concentration of *E-coli*).

FIG. 11 shows the cfu results over time obtained both in the control test and in the tests conducted with plasma treatment. In the control test, the cfu count in water was maintained at $10^5$ per mL during the first 16-min period as well as during the next 4-h storage period.

In the tests with plasma treatment, the $E$-coli concentrations consistently dropped during the period of treatment for the cases without and with microbubble generators. In the case without microbubble generators (i.e., Medium IC with an initial concentration of $10^5$ cfu/mL), there was a 2-log reduction in the cfu count during the plasma treatment of 25 min, and there was an additional 1-log reduction during the storage period of 2 h. In the case with microbubble generators and the same initial concentration (i.e., MB+Medium IC), there was a 2.2-log reduction in the cfu count during plasma treatment of 25 min, and there was an additional 2-log reduction during the first storage period of 2 h, followed by an additional 1-log reduction during the next 1-h storage period. In summary, the microbubble generators significantly improved the bacterial deactivation during the storage period.

In the case with microbubble generators and initial concentrations of $10^3$ and $10^6$ cfu/mL (i.e., MB+Low IC and MB+High IC), a similar tendency was observed in the reductions in the cfu counts over time. Especially in the case of high initial concentration of $E$-coli, i.e., $10^6$ cfu/mL, the cfu measurements showed a total 6-log reduction: a 4-log reduction during the plasma treatment of 25 min and an additional 2-log reduction during the storage period of 2 h.

Figure 12:
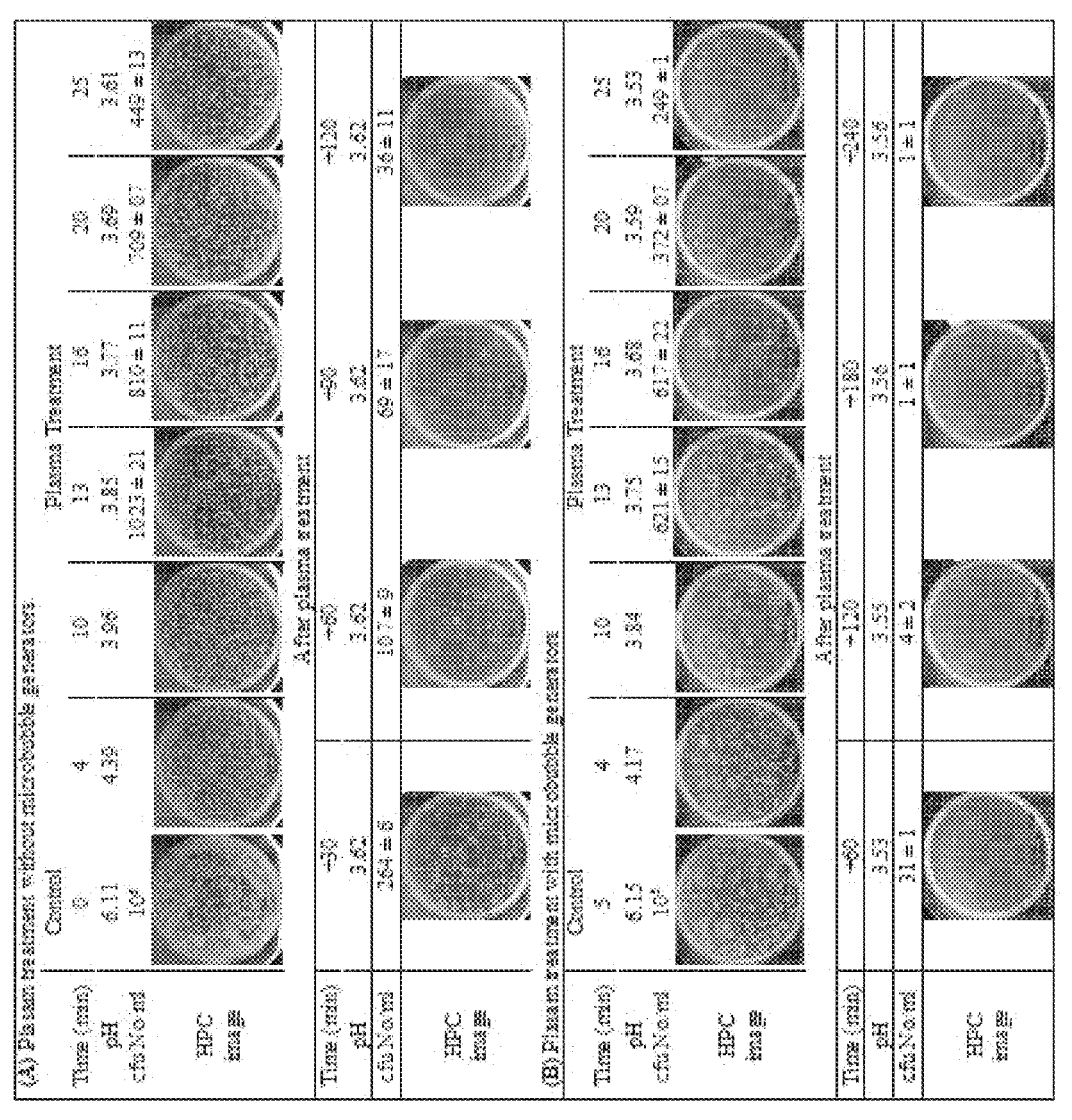

FIGS. 12A and 12B show photographic images of the plates used in the HPC measurements for the deactivation test using $E$-coli with plasma treatment—without and with microbubble generators, respectively. In the case without microbubble generators, the cfu count was 499±13 per mL at the end of 25-min plasma treatment, whereas the cfu count was 249±1 per mL in the case with them, indicating that the microbubble generators improved the efficacy of the plasma treatment by approximately 45%.

Figure 13:
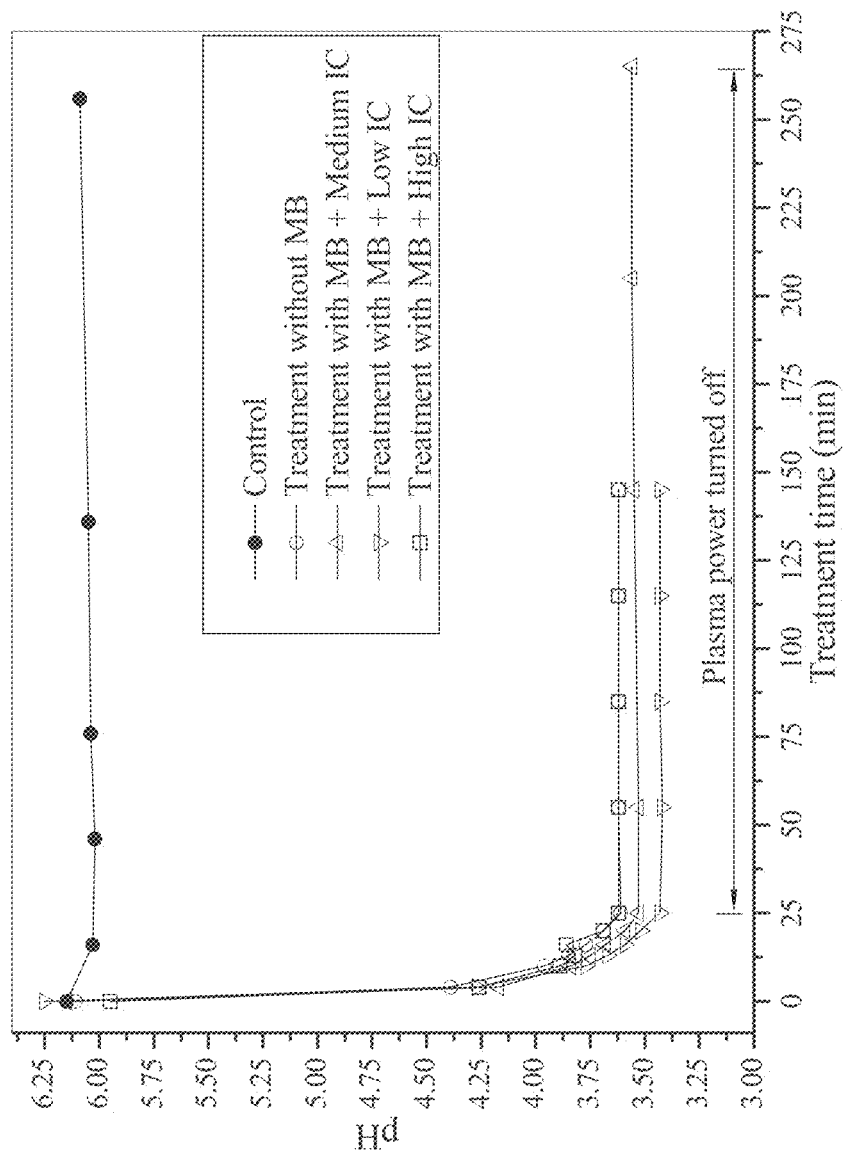
FIG. 13 is a graph depicting results of pH changes in *E-coli* inactivation experiments with an initial water volume of 20 L at water reservoir without and with microbubble generators. (MB=microbubble generators, IC=initial concentration of *E-coli*).

FIG. 13 shows the variations of pH at the reservoir during both the plasma treatment period and the storage period. Considering all four plasma-treatment cases, the pH of water at the reservoir decreased from an initial mean value of 6.15±0.10 to 3.55±0.1 at the end of plasma treatment, and the low pH values were maintained for next 2-4 h storage periods.

This example demonstrates the synergistic effects of $H_2O_2$ and low-pH conditions on the deactivation of microorganisms in plasma-treated water with a GA discharge. In particular, the study investigated the efficacy of microbubble generators and evaluated the residual effect of $H_2O_2$ and low-pH in plasma-treated water after the plasma treatment was completed. Accordingly, these results demonstrate a significant improvement with a total 6-log reduction with the same plasma treatment of 25 min with microbubble generators and a residual effect for 2-4 h after the treatment.

The microbubble generators produced a large number of microbubbles and at the same time uniformly dispersed them in the water so that these microbubbles increased the probability and frequency of contact with microorganisms in comparison with the case without microbubbles. These results demonstrate that the microbubble generators significantly enhanced the residual effect of the plasma treatment on the bacterial inactivation during the storage period (i.e., compare Medium IC and MB+Medium IC in FIG. 11). This residual benefit of the plasma treatment and the synergetic effect of $H_2O_2$ and low-pH water, assisted by microbubble generators, may have significant practical impact through increased energy efficiency and reduced energy costs associated with the plasma sterilization of water.

The presence of $H_2O_2$ is a reasonable indicator for hydroxyl radical formation by plasma discharge with water. $H_2O_2$ is formed in the final process of the combination of various radicals such as hydroxyl radicals. In the overall set of reactions, the concentration of $H_2O_2$ in water can increase with the plasma treatment.

Furthermore, the pH of water decreased due to the presence of $H^+$, see FIG. 13. In this example, a significant pH drop in the plasma-treated water can be attributed to positive charges ($M^+$) created in the plasma discharge that reach the water molecules and exchange charges with the water molecules, resulting in the creation of $H^+$ ions. Note that $H_2O_2$ in acidic water is a strong oxidizer and an effective tool for the deactivation of microorganisms and, furthermore, can impact the outer membranes of microorganisms directly through the peroxidation of cell membranes.

In summary, this example investigated the capability of the GA plasma water treatment in bacterial deactivation. The effects of microbubble generators and the residual effect of $H_2O_2$ in plasma-treated water were evaluated. Counts of cfu/mL in water decreased with plasma treatment time and further decreased during the storage period of 2-4 h. Additionally, pH levels in plasma-treated water decreased from an initial mean value of 6.15±0.10 to 3.55±0.1 at the end of the plasma treatment, which remained unchanged for the next 2-4 h storage period. $H_2O_2$ combined with low-pH acidic water is a strong oxidizer with significant capacity for bacterial deactivation.

Example 2: Residual Effects and Energy Cost of Gliding Arc Discharge Treatment on the Inactivation of *E. coli* in Water This example investigated the residual effect of gliding arc discharge (GAD) treatment on the inactivation of bacteria in a large volume of water (i.e., 20 L). In addition, this example also investigated the energy cost of the GAD treatments at different plasma treatment time of water contaminated with *E. coli*, considering the residual benefit of anti-microbial properties of plasma-treated water.

Figure 14:
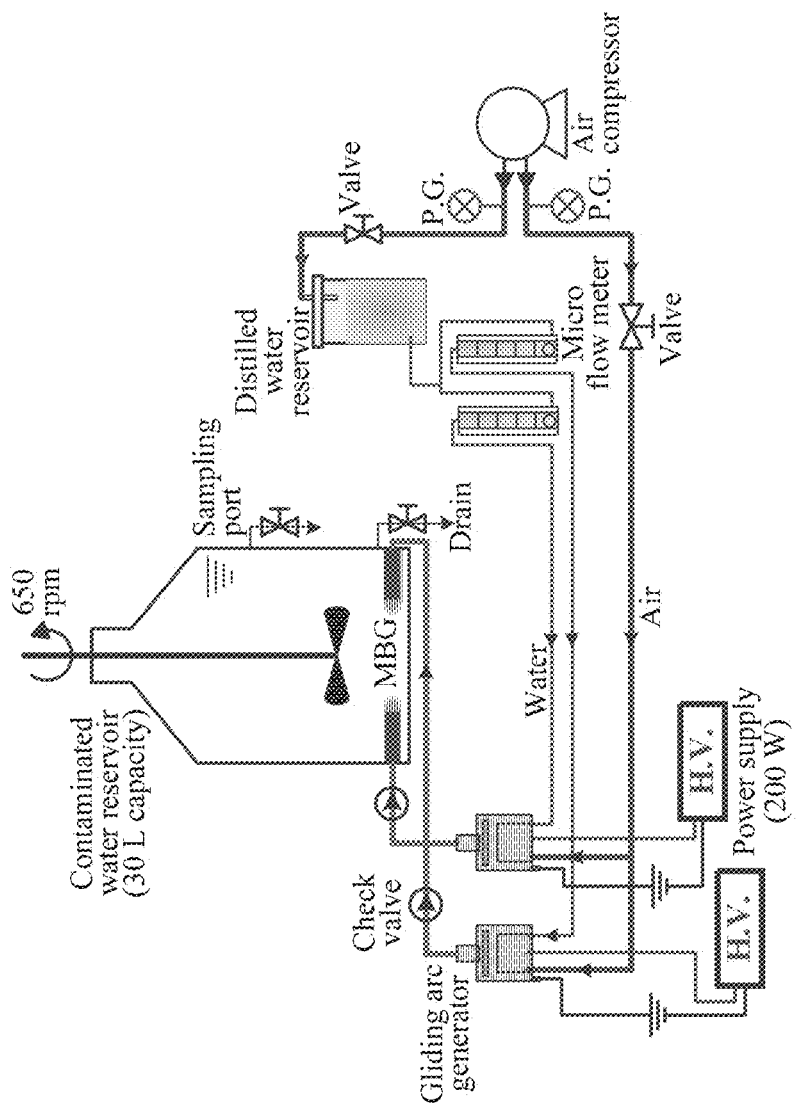
FIG. 14 is a schematic of another experimental setup for a plasma water treatment system using gliding arc discharge, similar to that as shown in FIG. 8: H.V.=high-voltage power supply, MBG=microbubble generator, P.G.=pressure regulator.

The experimental setup used in this example is illustrated in FIG. 14. The test setup consisted of three major parts: the first part comprised of two identical GAD systems, each driven by its own power supply; the second part was made of air and water-transport systems to provide controlled flows of air and water to the GAD system; and the third part was made of a reservoir tank with two microbubble generators to store bacteria-contaminated water and to receive plasma-treated air and distilled water. The basic approach in this example was to have both air and distilled water pass through the GAD system first and, then, to introduce plasma-treated air and water to a large volume of contaminated water at the reservoir (see FIG. 14). In order to provide airflow to the two GAD generators, an air compressor was used, where the air flow rate was controlled by a valve and a pressure regulator. The compressed air was also sent to the top of distilled water reservoir, as shown in FIG. 14, so that water would be pushed out through an exit located at the bottom of the reservoir near the GAD generator at a uniform flow rate, which was monitored by a micro flow meter.

With regard to the GAD system, each set of two stainless steel electrodes separated by a gap of 2.5 mm was connected to a power supply, which delivered 200 W. Since two GAD systems were used in the study, and each GAD system was powered by its own power supply, the total power consumption was 400 W for both plasma discharges. Compressed air was tangentially introduced to the gap space at the outer edge of the two circular electrodes through six small nozzles, resulting in a gliding arc. Water was also injected tangentially through six small nozzles to the plasma arc jet exiting from nozzle.

Figure 15:
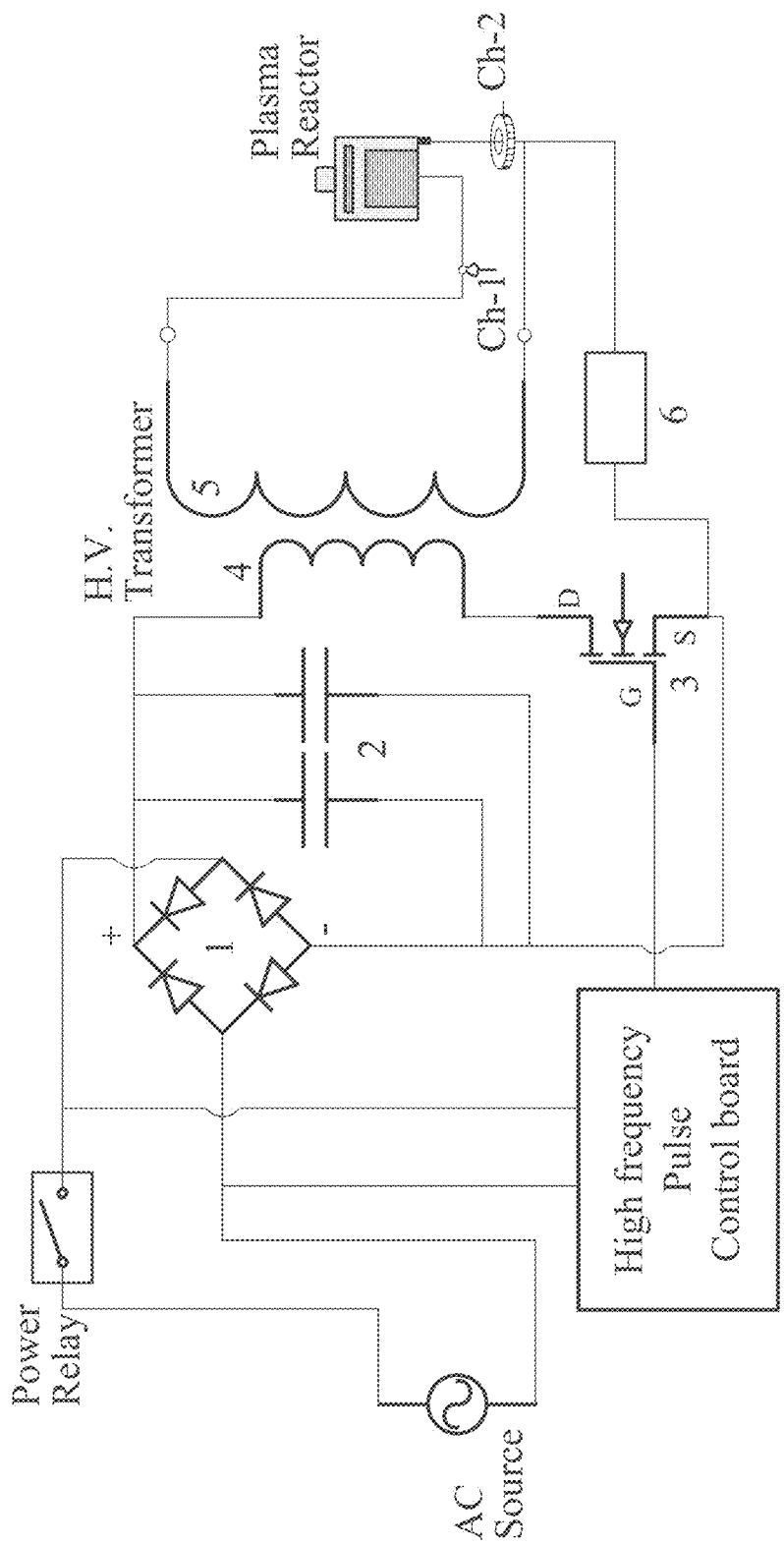
FIG. 15 is a circuit diagram of a power supply to generate 200 W of GAD: (1)=Voltage rectifier with Diode bridge, (2)=Capacitors, (3)=Transistor to control primary coil, (4)=Primary coil, (5)=Secondary H.V. coil, (6)=Electromagnetic interference Filter, (Ch-1)=Voltage measurement with H.V. probe (×1000), and (Ch-2)=Current measurement with magnetic core probe (×10 A/V).

FIG. 15 shows the schematic circuit diagram of the power supply used in this study, which is customized to produce alternating high voltage and current, and high frequency (B&N Inc., South Korea). The power supply mainly consisted of four components; voltage rectifier with diode bridges to convert from AC to DC, capacitors to accumulate energy, high voltage transformer to transfer energy to plasma reactor, and transistor to drive primary coil.

Figure 16:
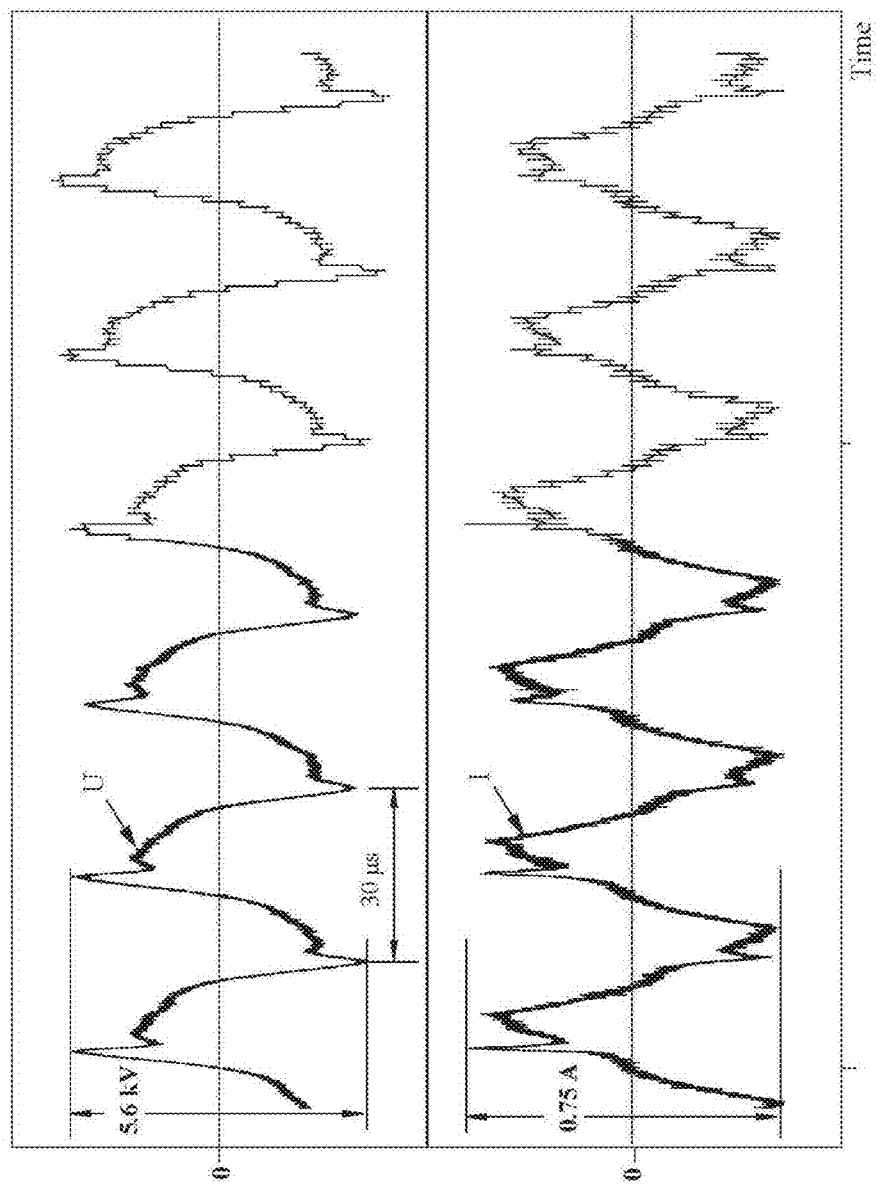
FIG. 16 is a graph of profiles of voltage and current obtained during the gliding arc discharge with water introduction: U=Voltage, I=Current, T=30 µs, f=33.3 kHz.

FIG. 16 shows voltage and current profiles produced by the AC power supply, which were measured and recorded by a digital phosphor oscilloscope (TDS3014C, Tektronix). For the measurement of the current, a magnetic core current probe was utilized (CM-10-L, Ion Physics Corporation, Fremont, N.H.), whereas the voltage was measured using a high voltage probe (P6015A, High Voltage Probe 1000×75 MHz, Tektronix). Peak-to-peak voltage (U) and current (I) were determined to be 5.6 kV (based on settings of 1.0 V per division×1000 for the voltage probe) and 0.75 A (based on settings of 50 mV per division×10 A/V for the current probe). The frequency (f) of HV pulses was 33.3 kHz, a value that was determined from pulse period (T) of 30 μs measured with the oscilloscope.

The water reservoir was cleaned after each test with both sulfuric acid and tap water repeatedly and then dried in a fume hood. Then, the water container was filled with 20 L of pure distilled water to prepare for the next test, and the flexible tube from the GAD system was re-connected to the reservoir.

The flow rate of water to each GAD system was 120 mL/min at a uniform air flow rate of 3.8 scfm, an optimal condition for the GAD system. The pH level in plasma-treated water was measured with a pH meter (HI 9125N, HANNA Instruments, Smithfield, R.I.). Prior to starting each experimental test run, the pH meter was calibrated at three points (i.e., pH: 4, 7, and 10) using standard-pH solutions provided by the pH meter manufacturer.

*Escherichia coli* (*E. coli*) was used for bacterial experiments. Cultures of *E. coli* were grown for 18 h at 37° C. in an incubator and diluted, yielding a range of concentrations between $10^5$-$10^6$ colony forming units per milliliter (cfu/mL) as initial test conditions. The cfu measurements in all water samples were conducted using an aerobic heterotrophic plate count (HPC) method by the serial dilutions of samples. For bacterial inactivation tests, cultures of *E. coli* were added to the reservoir filled with distilled water of 20 L in volume. Immediately after adding *E. coli* to water, the water reservoir was continuously stirred using an electrical stirrer (Eurostar/IKA, Staufen, Germany) at 650 rpm to distribute *E. coli* uniformly in the reservoir. After stirring water for 5 min, 50-mL samples were collected in sterile tubes for cfu counts.

Prior to plasma inactivation tests, a control test (see FIG. 17) was performed with an initial bacterial count of $10^5$ cfu/mL in the reservoir holding 20 L of contaminated distilled water, where an additional 2.8 L of distilled water was introduced through the GA system at a flow rate of 2×120 mL/min for 16 min as per procedures but with the plasma power turned off. The water was then kept at the reservoir for the next 4 h, during which time the cfu numbers in water was determined.

In cases with plasma treatment, the initial concentration of *E. coli* in the reservoir varied from $10^5$ to $10^6$ cfu/mL. Each plasma treatment in distilled water with *E. coli* added was conducted for 10, 13, 16 and 25-min, during which plasma-treated water and gas was continuously delivered to the reservoir. The initial volume of the contaminated water in the reservoir was 20 L. For the cases of 10, 13, 16 and 25-min treatments, approximately 2.4, 3.1, 3.8 and 6 L of plasma-treated water, respectively, were added to the reservoir during the treatment.

Two water samples of 50 mL each (including at t=0, i.e., before treatment) were collected for cfu and pH measurements during the plasma treatment period, and 8 additional samples of 50 mL each were also collected from plasma-treated water every 30-min (at t=30, 60, 90, 120, 150, 180, 210 and 240-min) during the storage period (see FIG. 18-21). 1-mL water sample for cfu measurement at each time period was collected using a sterile pipette from 50-mL water sample, which was continuously stirred with a vortex mixer (Fisher Scientific: Genie 2). Each 1-mL sample water was spread on Brain Heart Infusion Agar plate (Fisher Scientific) inside a clean bench within 5 min after collecting the 50-mL water sample from the reservoir. All agar plates containing water samples were dried for 30-min at room temperature inside the clean bench and incubated for 18 h at 37° C. The number of colony forming units was determined using a colony counter (Digital Colony Counter/HYC-560, Korea). Prior to performing cfu counts of $E.\ coli$ on agar plates after incubating, the HPC images were recorded with a digital camera. $E$-$coli$ inactivation tests including the control test were repeated three times, and the mean cfu/mL with standard deviation for each test is shown in their respective Figures.

Figure 17:
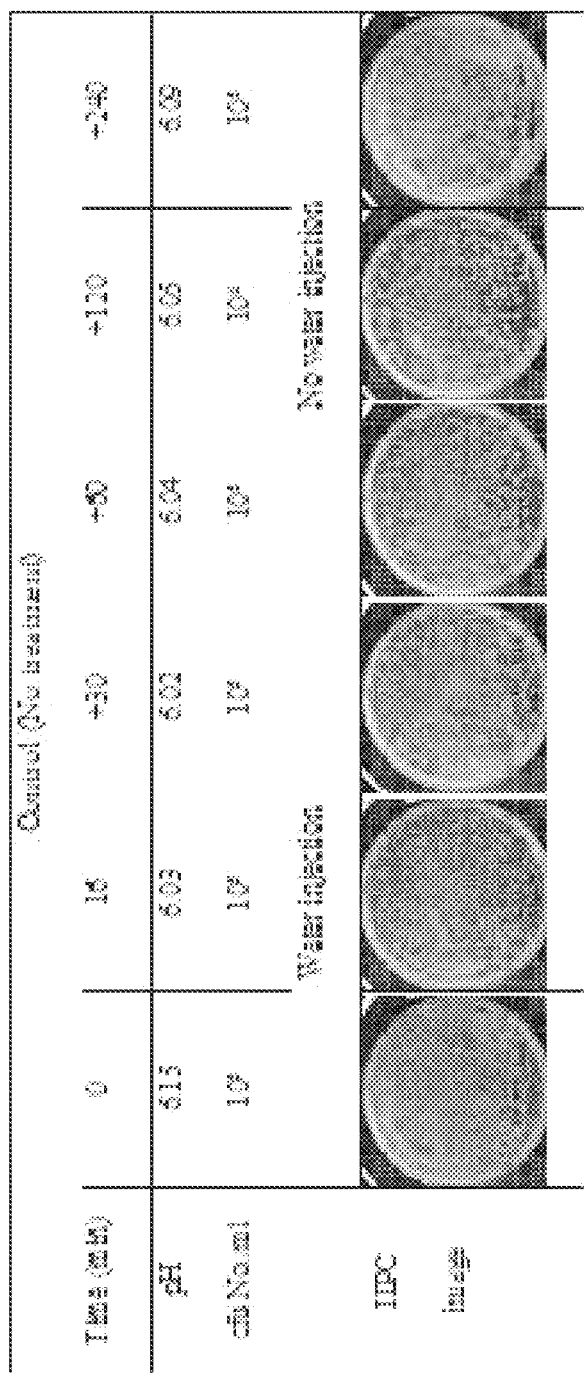
FIG. 17 depicts the results of a control test: results of *E. coli* inactivation experiment without gliding arc discharge but with water injection flow rate of 120 mL/min and air flow rate of 3.8 scfm.

FIG. 17 shows that the control sample (i.e., without plasma treatment) maintained its initial cfu number of $10^5$ per mL during 16-min period of treatment with water and air injections only, as well as during the 4-h storage period. Significant levels of cultured $E.\ coli$ were observed in the HPC images in water collected from the reservoir in this control test when the water was not treated with the plasma.

Figure 18:
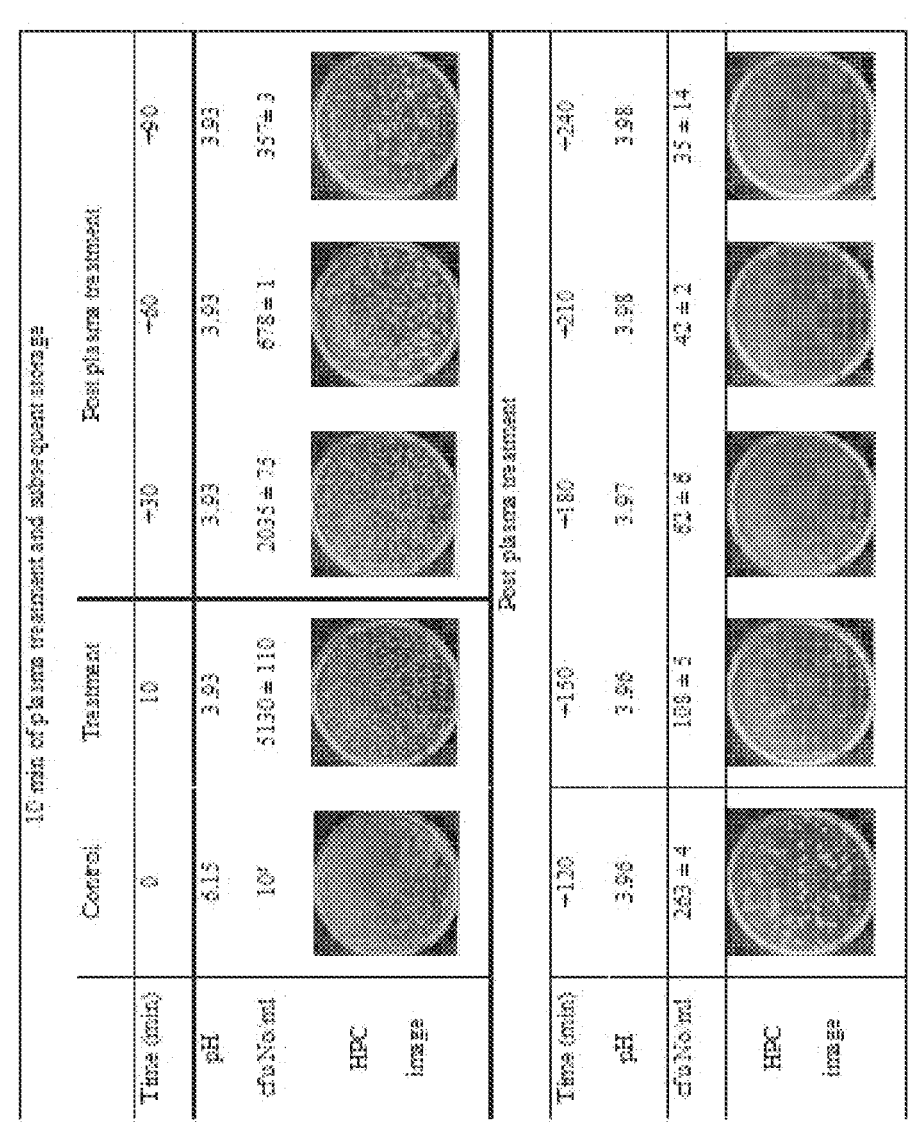
Figure 19:
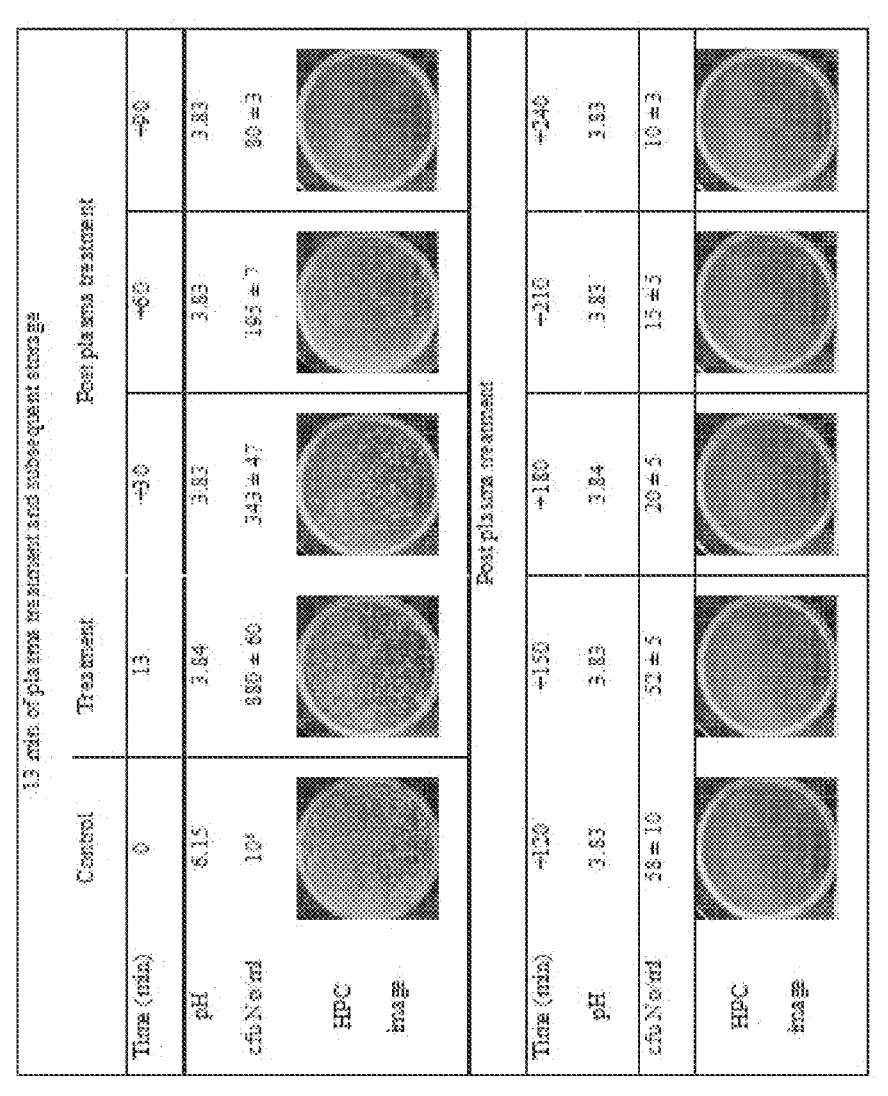
Figure 20:
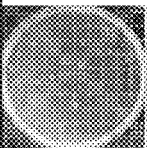
FIG. 20 depicts the results of a plasma treatment for 16-min: results of *E. coli* inactivation experiments and pH variations with an initial water volume of 20 L at reservoir with 19.2 kJ/L of energy consumption.
Figure 21:
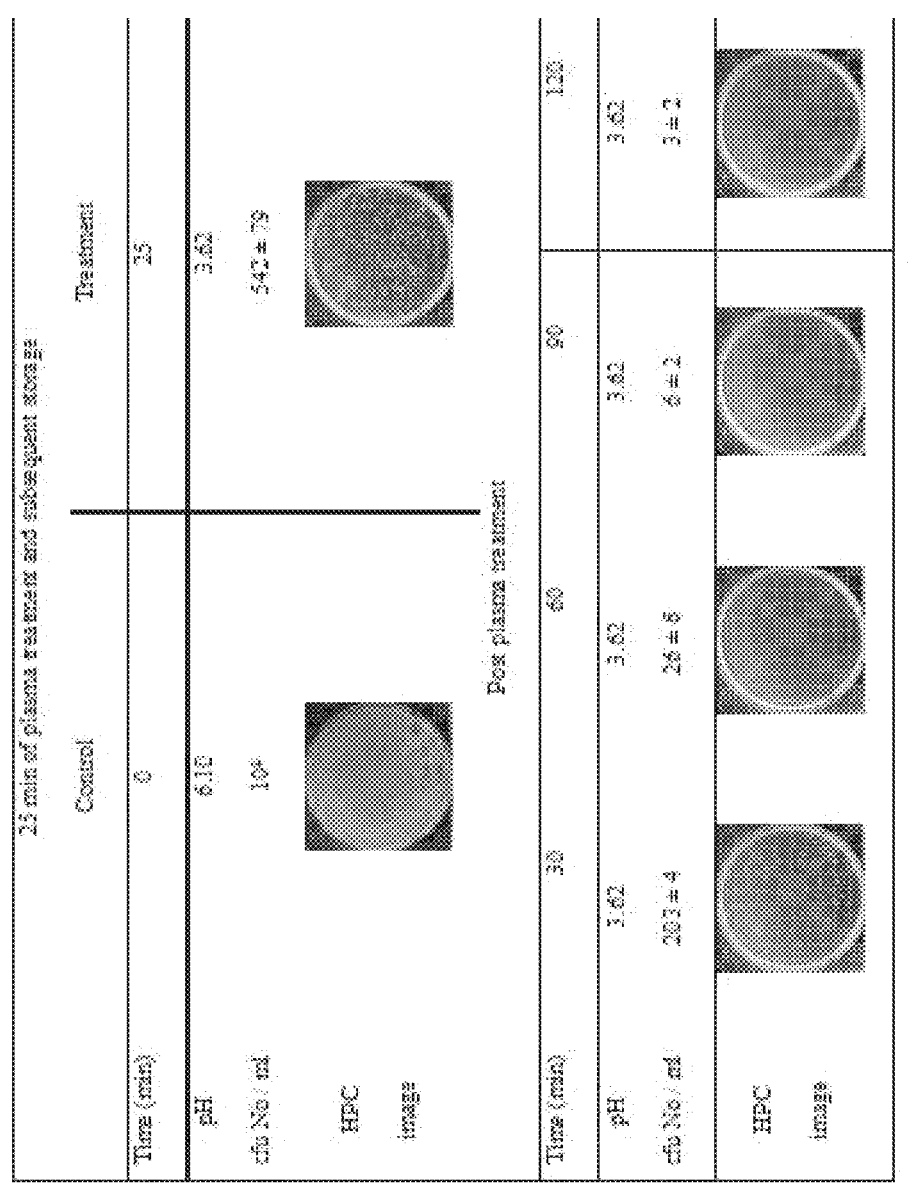

FIGS. 18-20 show photographic HPC images for the cases of inactivation tests with 10, 13, and 16-min plasma treatments for an initial $E.\ coli$ concentration of $10^5$ cfu/mL. FIG. 21 shows the corresponding images for 25-min plasma treatment with an initial $E.\ coli$ concentration of $10^6$ cfu/mL. The energy cost for treatment of 1-L water was calculated. For example, for the case of 10-min treatment, the energy consumption was determined as:

Energy cost=400 W×10 min×60 s/20 L=12 kJ/L

In a similar manner, for the 13, 16, and 25-min plasma treatment cases, the energy costs were determined as 15.6, 19.2, and 30.0 kJ/L, respectively.

The cfu data for the cases with plasma treatments were consistently reduced with increasing plasma treatment time (i.e., plasma intensity). In addition, the pH reduced greatly with the plasma treatment and remained unchanged during the storage period.

FIG. 18 also shows the cfu counts for the case of 10-min plasma treatment, followed by 4-h storage. The value of cfu/mL significantly decreased to 5130±110 (i.e., 1.5-log reduction) at the end of the plasma treatment and further reduced to 35±14 cfu/mL (i.e., 2.1-log reduction) at the end of the 4-h storage period, resulting in a total 3.6-log reduction.

FIGS. 19 and 20 show the cfu results for the cases of 13- and 16-min plasma treatments, respectively. The results in FIG. 19 show 2-log reduction in cfu/mL at the end of the plasma treatment with an additional 2-log reduction during the subsequent storage period, resulting in a total 4-log reduction. The results in FIG. 20 show nearly 2.7-log reduction at the end of the 16-min plasma treatment with an additional 2.3-log reduction during the subsequent storage period, resulting in a total 5-log reduction, i.e., the best performance among the tests conducted in the present study.

FIG. 21 shows the cfu counts for the case of 25-min plasma treatments with an initial condition of $10^6$ cfu/mL. At the end of the plasma treatment, there was 3.5-log reduction followed by an additional 2.5-log reduction after 2-h storage, resulting in a total 6-log reduction. Using the data on the log-reduction, the energy cost per 1-log reduction becomes 3.3, 3.9, 3.8, and 5.0 kJ/L/1-log reduction for the cases of the 10, 13, 16, and 25-min plasma treatment, respectively. This residual effect of the anti-microbial properties improves the plasma energy cost. The optimum energy cost of the GAD system in the present study to inactivate $E.\ coli$ in 20-L water was found to be approximately 3.8 kJ/L/1-log reduction.

Figure 22:
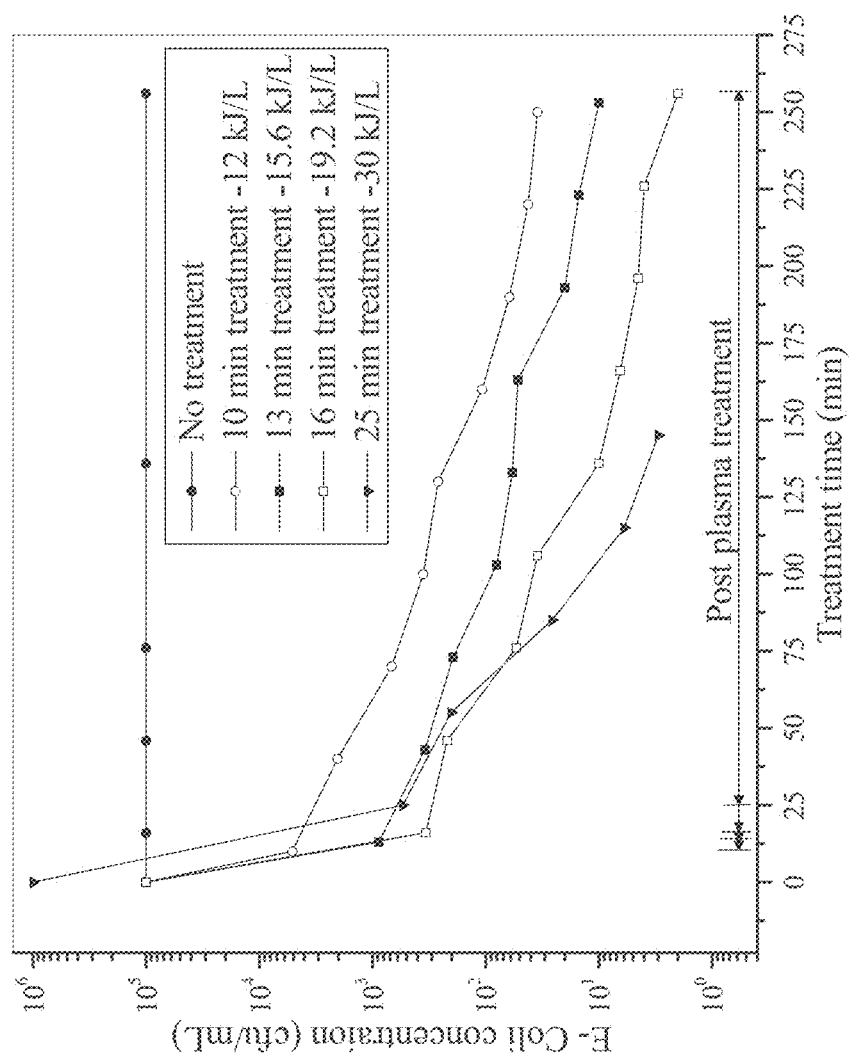
FIG. 22 is a graph depicting results of *E. coli* inactivation experiments by gliding arc (GA) discharge system with various treatment times (plasma intensity) in an initial water volume of 20 L at reservoir.
Figure 23:
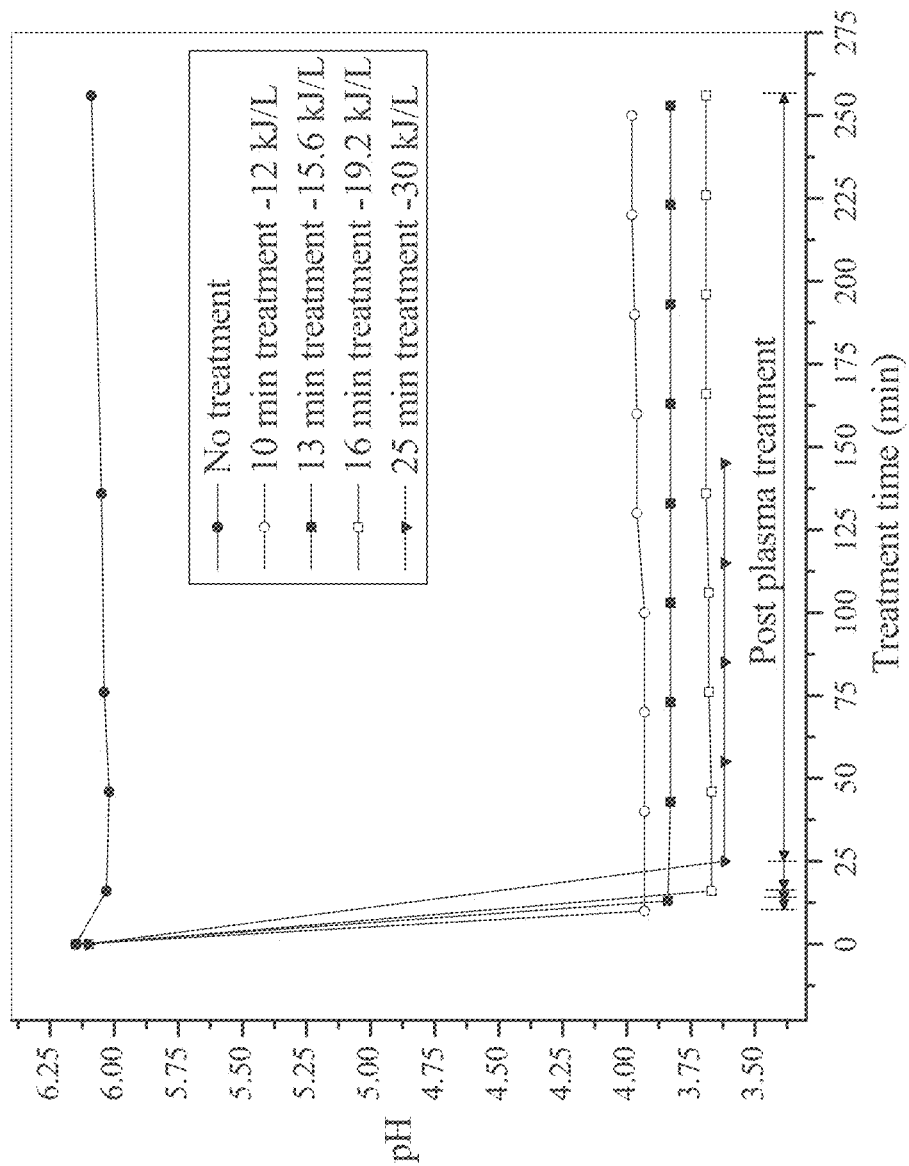
FIG. 23 is a graph depicting results of pH changes in experiments by GA system with various treatment times (plasma intensity) in an initial water volume of 20 L at reservoir.

FIG. 22 shows the variations in $E.\ coli$ concentrations for all cases in the present study, including the control case (i.e., no treatment), whereas FIG. 23 provides the variations in pH during the plasma treatment and subsequent storage periods.

Comparing the bacterial inactivation results with the pH variations in all plasma-treated cases, the reduction trends for pH and $E.\ coli$ concentration followed similar trends. Pooling together all of the test data across 5 arms of this study (10, 13, 16, 25 min of plasma treatment and no treatment control), reflecting a range of treatment durations and storage times, a moderately strong correlation was observed between pH and $E.\ coli$ concentration (R=0.52, p=0.0004). For the plasma treatment cases with 10, 13, 16 and 25-min, the pH values decreased from the initial pH of 6.13±0.03 to 3.93, 3.83, 3.68 and 3.62, respectively, at the end of the treatment, which were maintained almost constant during the storage period. Since the reductions in $E.\ coli$ concentration almost coincide with those in pH in water, one can attribute the residual effects of the plasma treatment on the inactivation of water to the low pH of water.

Example 1 demonstrated that the GAD system produced $H_2O_2$ in plasma-treated water. Experimental results in this example indicate that the pH in the treated water was lowered to as low as 3.62 in a large volume of water. This phenomenon (i.e., the formation of acidic water) can be attributed to $H_3O^+$ ions and nitric acid ($HNO_3$) generated as a product of the interaction of the plasma discharge at gas (air)-liquid interfaces [39].

Without being limited to any particular theory, the concentration of $H_2O_2$ in water increases with plasma treatment. A significant pH drop observed in this example can be attributed to positive charges ($M^+$) created in the plasma discharge that reach the water molecules and exchange charges with the water molecules, resulting in the creation of $H_3O^+$ ions and OH radicals playing an important role in sterilization.

When air is the carrier gas, nitrogen oxides can be formed from gas phase reactions of dissociated nitrogen and oxygen. The nitrogen oxide ($NO_2$) affects the pH of the water through the formation of acids and ions as in the following reactions. The reaction between $NO_2$ formed and hydroxyl radicals (OH) formed can generate $HNO_3$ which results in acidic water (i.e., $HNO_3$).

A number of studies on the antimicrobial effects of plasma have indicated OH and NO as the effective species. The generation of these two reactive species depends on the humidity of air injected into the GAD. For example, the concentration of OH generated by the GAD can increase much higher than that of NO as the humidity of the carrier gas increases. The OH formed from the dissociation of water can lead to the formation of $H_2O_2$ due to the recombination of OH. Hence, when pure water is injected into the GAD, the concentration of $H_2O_2$ becomes much higher than that of nitrous acid ($HNO_3$) or nitric acid formed from the reaction of OH and $NO_x$.

The plasma water treatment system in this example produced an increase in $H_2O_2$ concentration and a low-pH environment in water. These two effects are proposed as the main mechanism for $E$-$Coli$ inactivation given the present system with distilled water and air injected into a GAD and these fluids subsequently sent to a solution of bacteria-containing water. Note, that $H_2O_2$ is not itself a strong oxidizer. Also, note that acidic water is not a strong oxidizer. However $H_2O_2$ in the presence of acidic water becomes a very strong oxidizer and an effective tool for the inactivation of microorganisms, making a direct impact on the outer membrane of microorganisms due to the peroxidation of a cell membrane. In the present study, as the plasma-treated water by the GAD was pumped to bacteria-filled water, the optimal bacterial inactivation was achieved with 16-min treatment, resulting from the combined effect of the high concentration of $H_2O_2$ and low pH level in water as shown in FIG. 20. In other words, the longer plasma treatment did not improve the bacterial inactivation in the present GAD system. However, further inactivation was obtained as manifested by reduced cfu values by letting the plasma-treated water sit for several hours.

The synergetic effect of $H_2O_2$ and low pH in water treated by the GAD is enhanced by a powerful residual treatment effect during the post-treatment storage period, where no additional energy is consumed. Additional studies are needed to better understand the scale-up issue in the treatment of a large volume of water.

In summary, plasma treatment of water with GAD decreased the pH of water due to the presence of $H_3O^+$ ions and $HNO_3$. The residual effect of active plasma species and low-pH on the inactivation of a large volume of water (i.e., 20 L) has been shown with plasma treatment of 13, 16, 19, and 25-min. Although the plasma treatment provided only partial inactivation at the end of the plasma treatment, remaining *E. coli* was inactivated during the subsequent storage period by the residual effect of the plasma treatment on water. The residual effect on the anti-microbial property increased with the duration of the plasma treatment.

The disclosures of each and every patent, patent application, and publication cited herein are hereby incorporated herein by reference in their entirety.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

The invention claimed is:

1. A system for plasma treatment of a liquid, the system comprising:
   a piping flow system including a liquid inlet tube, a liquid outlet tube connected to a liquid storage reservoir, and a head-space;
   a sparger connected to a gas source, the sparger positioned within the liquid;
   a pair of electrodes positioned within the liquid and above the sparger;
   a microbubble generator including a cylindrical tube with ends blocked by endplates positioned within the liquid outlet tube, the cylindrical tube including pores in the range of 0.1 to 5 microns in size for the gas from the head-space to flow through; and
   a conduit between the head-space and the microbubble generator, such that gas from the head space can travel through the conduit to the microbubble generator.

2. The system of claim 1, wherein the conduit between the head-space and the microbubble generator includes a compressor pump.

3. The system of claim 1, wherein the sparger includes pores of at least 1 mm in size for the gas from the gas source to flow through.

4. The system of claim 1, wherein the conduit between the head-space and the microbubble generator is connected to one of the endplates.

5. The system of claim 1, wherein the conduit between the head-space and the microbubble generator is connected to a sidewall of the cylindrical tube.

* * * * *